United States Patent [19]

Silvestri et al.

[11] 4,304,505

[45] Dec. 8, 1981

[54] METHOD FOR REPAIRING A DAMAGED PIPE LAID ON DEEP SEA BEDS

[75] Inventors: Antonio Silvestri, San Donato Milanese; Guglielmo Gargatagli, Milan, both of Italy

[73] Assignee: Saipem, S.p.A., Milan, Italy

[21] Appl. No.: 105,589

[22] Filed: Dec. 20, 1979

[30] Foreign Application Priority Data

Jan. 8, 1979 [IT] Italy ............................. 19123 A/79

[51] Int. Cl.³ ............................................. F16L 1/04
[52] U.S. Cl. .................................. 405/170; 405/171
[58] Field of Search ........................... 405/154–171, 405/188, 189; 29/234, 200 P; 285/18, 24

[56] References Cited

U.S. PATENT DOCUMENTS

| | | | |
|---|---|---|---|
| 2,922,664 | 1/1960 | Risley et al. | 405/170 X |
| 3,204,417 | 9/1965 | Robley | 405/170 |
| 3,481,396 | 12/1969 | Williams et al. | 285/18 X |
| 3,578,233 | 5/1971 | Meister | 405/170 X |
| 3,641,777 | 2/1972 | Banjarich et al. | 405/188 |
| 3,843,168 | 10/1974 | Morrill et al. | 285/24 |
| 4,014,180 | 3/1977 | Kelly et al. | 405/170 |
| 4,019,334 | 4/1977 | Sinclair et al. | 405/169 |
| 4,051,687 | 10/1977 | Ells | 405/171 X |
| 4,171,175 | 10/1979 | Nobileau et al. | 405/170 |
| 4,218,158 | 8/1980 | Tesson | 405/170 |

*Primary Examiner*—Dennis L. Taylor
*Attorney, Agent, or Firm*—Morgan, Finnegan, Pine, Foley & Lee

[57] ABSTRACT

A method is disclosed for repairing a damaged pipe laid on deep sea beds, said method substantially comprising the step of joining a central pipe stub between the ends of the two adjoining pipe portions, such operation being performed directly on the sea bed rather than on the pipe-laying barge. Special coupling sleeves are provided at both ends of the central pipe stub, said sleeves being received in a watertight manner on the two pipe terminal portions, by clamping said sleeves thereon. Apparatus and tools for carrying out said method are described in great detail.

8 Claims, 32 Drawing Figures

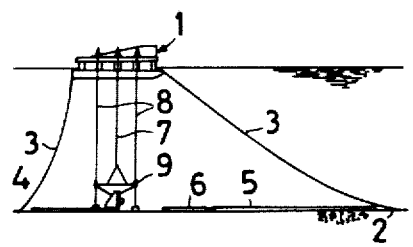
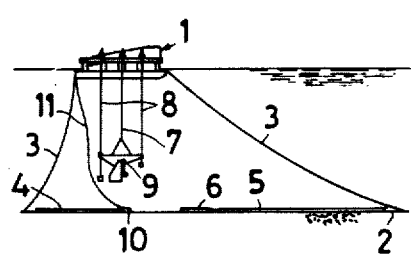
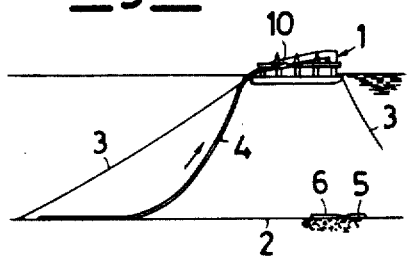
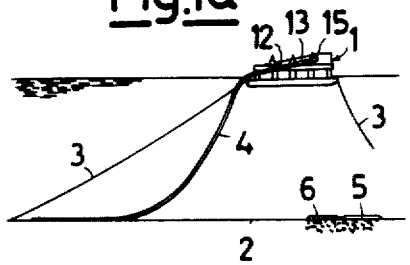
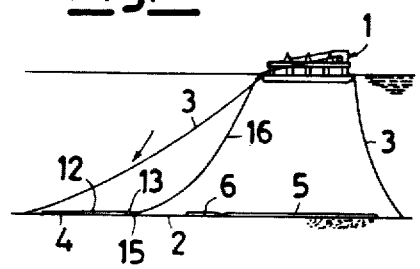
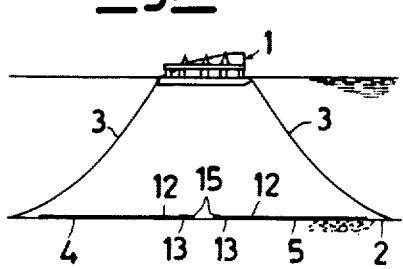

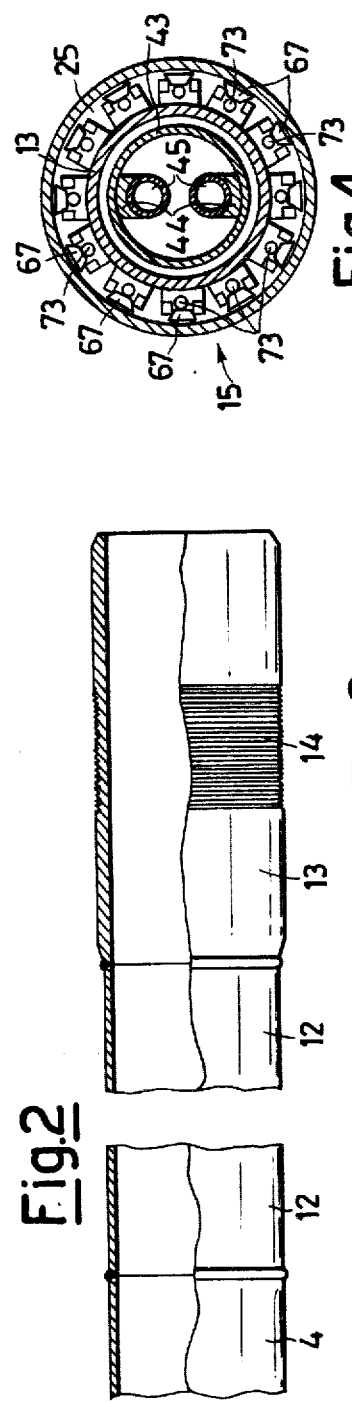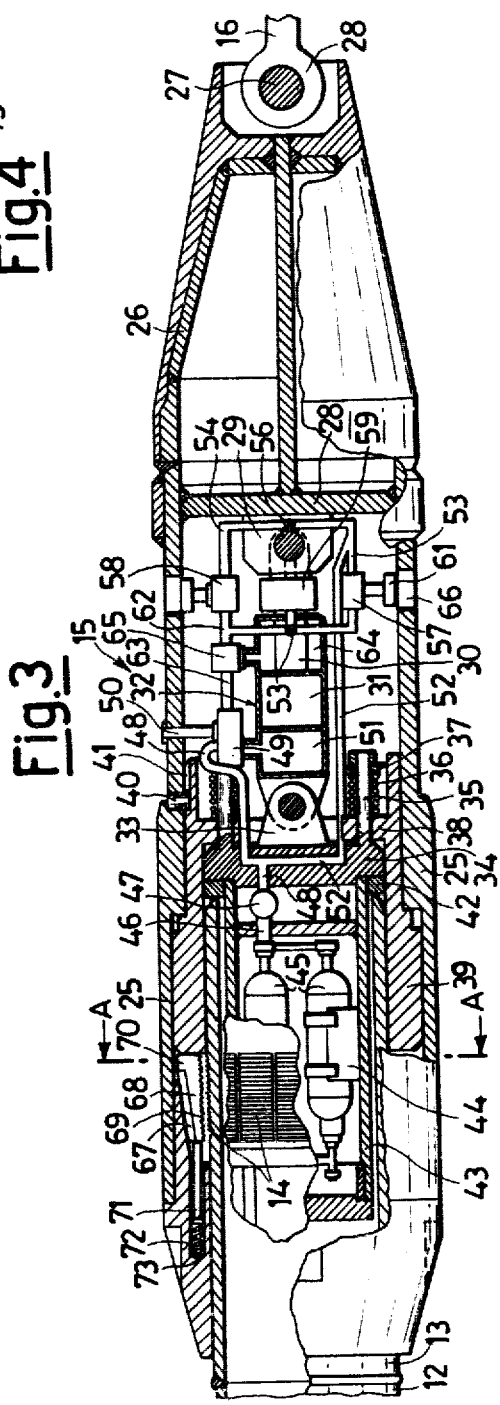

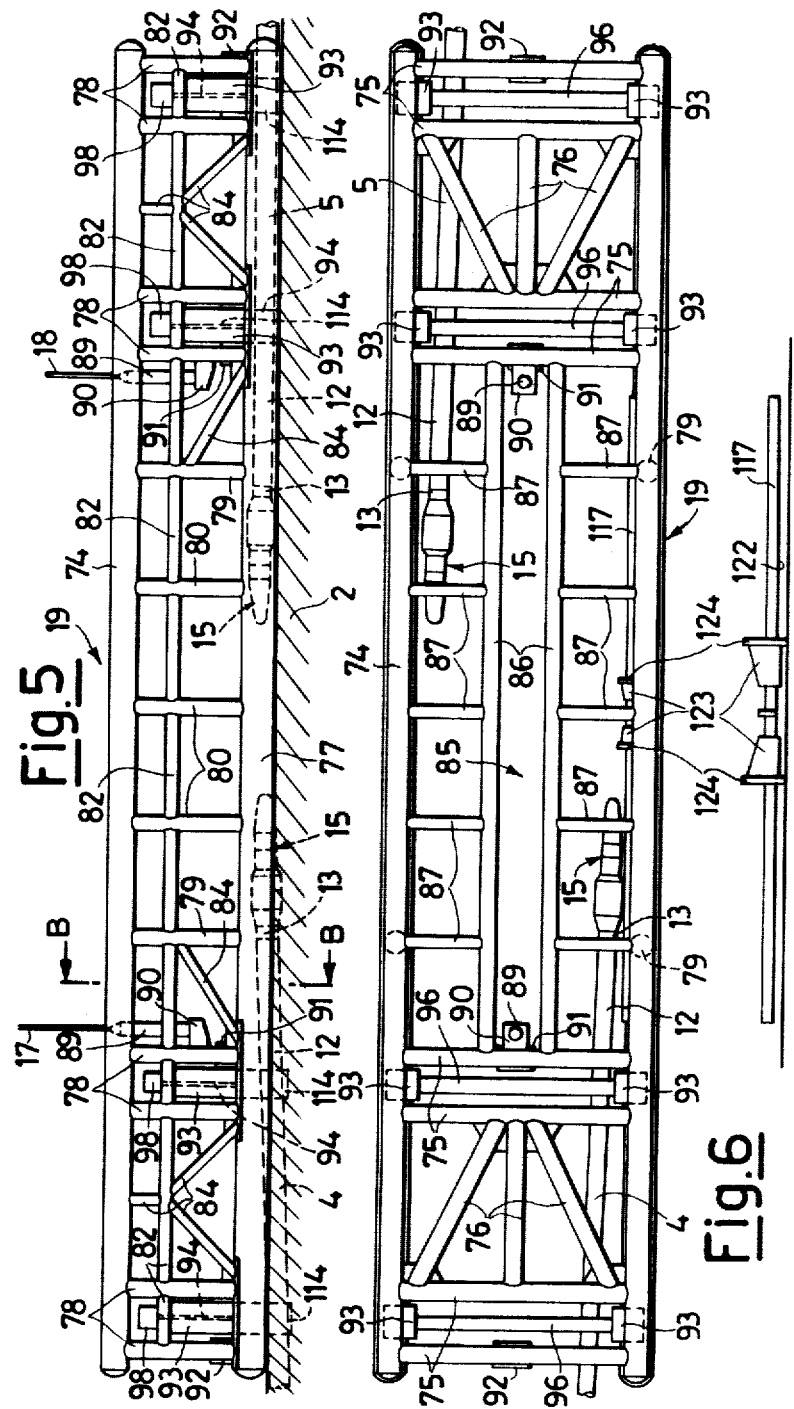

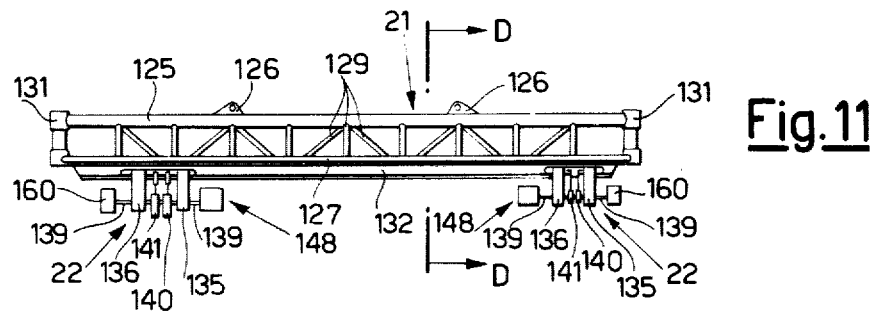
Fig. 11
Fig. 13
Fig. 12
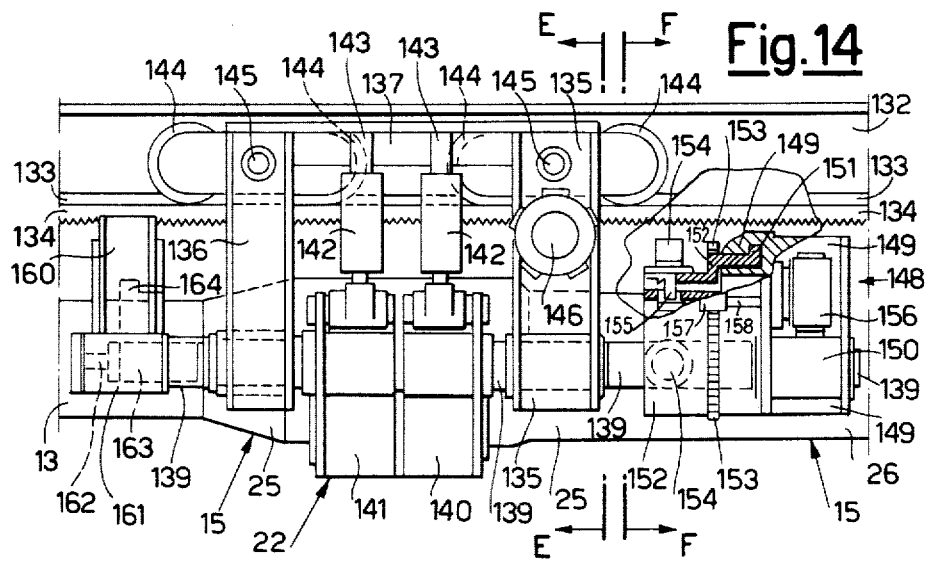
Fig. 14

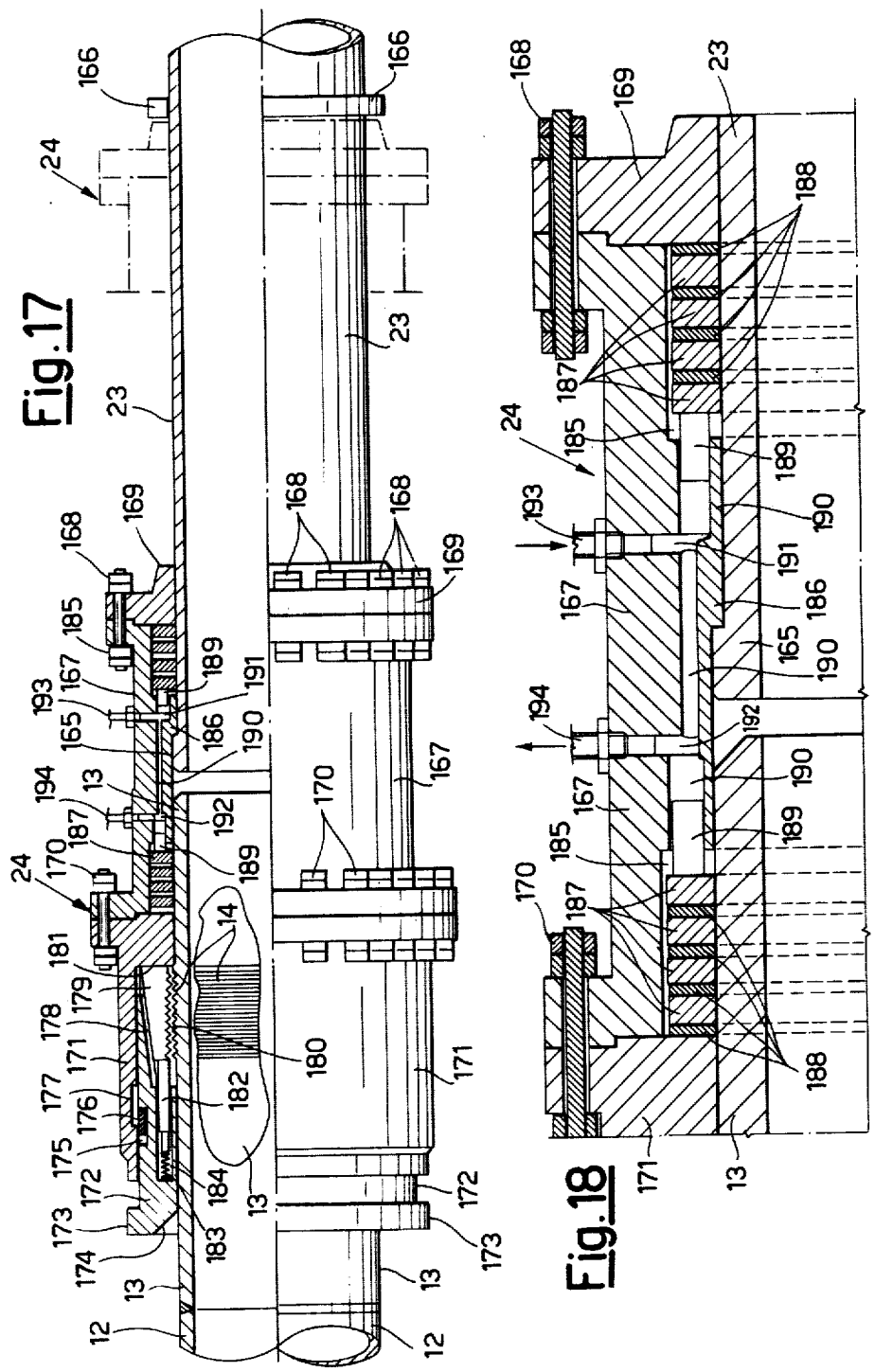

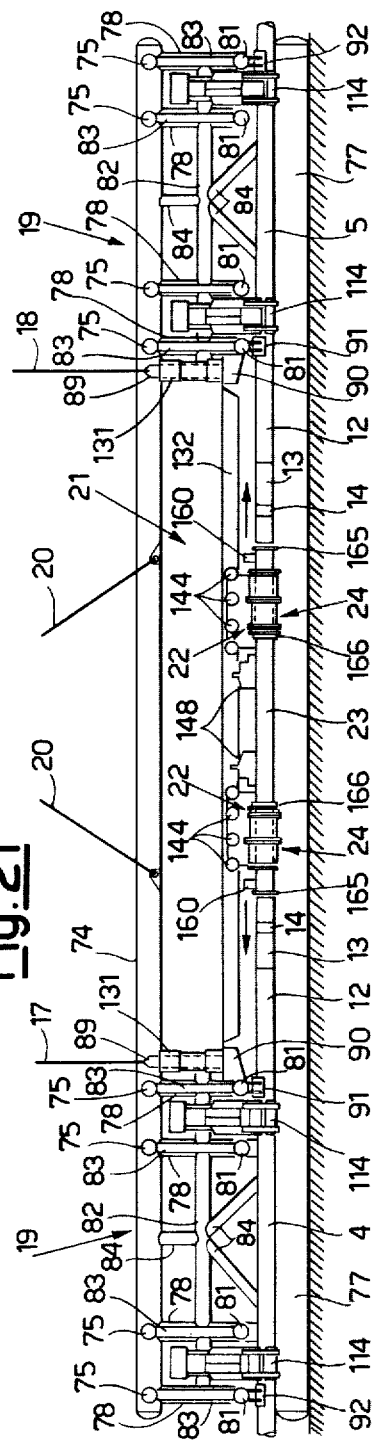
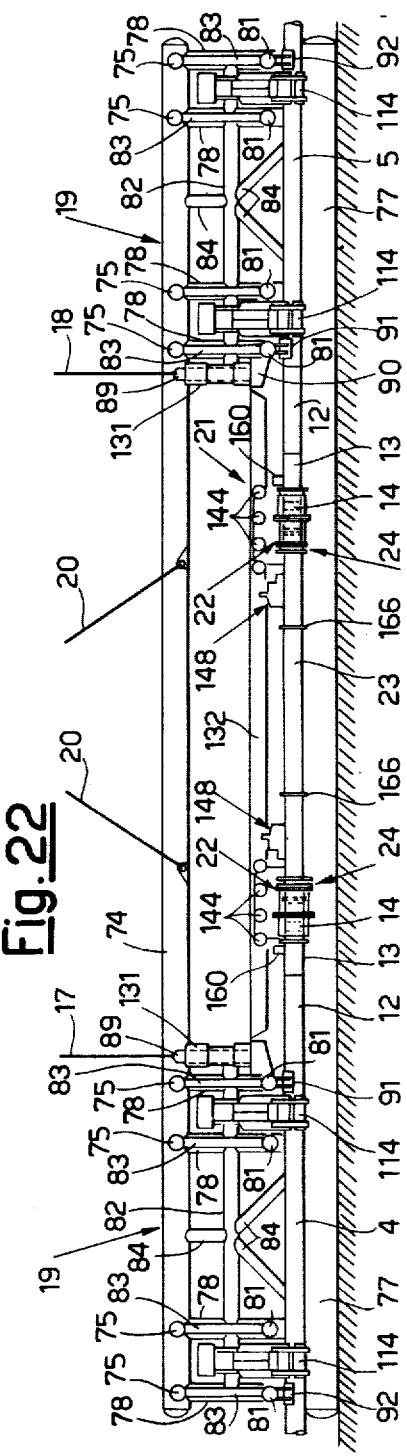

METHOD FOR REPAIRING A DAMAGED PIPE LAID ON DEEP SEA BEDS

This invention relates to a new method for perfectly, effectively and reliably repairing a damaged pipe, even when laid on deep sea beds, by raising it on to a depot ship, then carefully preparing the ends of the two portions of the pipe to be repaired by welding thereto special pipe terminal pieces provided with knurled clamping surfaces which, as said pipe portions are relowered on to the sea bed, are protected by special releasable discardable heads, said two pipe portions thus prepared being then perfectly aligned on the sea bed, said discardable heads then being released and recovered and the free distance then being exactly determined between the two said pipe terminal pieces fitted on to the ends of the two aligned pipe portions, a central pipe stub provided at its two ends with coupling sleeves then being accurately inserted between the two said pipe terminal pieces, said stub being of the determined length, said coupling sleeves of said central pipe stub then being clamped in a perfectly sealed manner on to said knurled clamping surfaces of said pipe terminal pieces, all the aforesaid operations on the sea bed being carried out automatically and thus without the aid of divers.

The invention also relates to special apparatus by which the aforesaid method can be carried out rapidly, accurately and economically.

The increasing requirement for laying pipes on deep sea beds makes it necessary to be able to repair said pipes when damaged because of having been cut by dragged anchors, because the conveyed fluid leaks due to welding defects, or because of defects caused by insufficient cathodic protection or rustproofing.

At the present state of the art, the method used for repairing a damaged pipe laid on the sea bed consists of lowering an apparatus equipped for pipe recovery from a depot ship, guiding it and clamping it on to the pipe to be repaired, cutting the pipe at one end of its damaged piece by the cutting device of said apparatus, inserting and locking the composite sealing and recovery head of said apparatus into that end of the pipe portion which has been freed from the damaged part, recovering said apparatus on board the depot ship, emptying the water which fills said pipe portion, raising the end portion of said pipe portion on to the depot ship by a recovery cable hooked to said composite sealing and recovery head, then repeating all the aforesaid operations in order to free the other pipe portion from said damaged pipe piece and recover the end portion of said other pipe portion on board the depot ship, then freeing the ends of the two said pipe portions from their composite sealing and recovery heads on board the depot ship, then welding or joining a central integral pipe stub between said ends of the two pipe portions, and finally resting the repaired pipe on the sea bed by lowering it laterally by moving the depot ship in a direction perpendicular to the pipe.

Besides requiring a special depot ship, this known method cannot in any case be used if the pipe to be repaired is laid on sea beds more than 600 m deep, because at such a depth the excessive length and weight of the repaired pipe to be laid on the sea bed makes it impossible to carry out this operation without danger of kinking and consequent fracture of part of the repaired pipe.

The object of the present invention is to obviate the aforesaid drawback and to provide a new method by means of which it is possible to perfectly and effectively repair a damaged pipe, even when this is laid on deep sea beds on which it is not possible for divers to work.

This is attained substantially in that said central pipe stub is joined between the ends of the two pipe portions not on the depot ship but on the sea bed, thus dispensing with the need to lower the repaired pipe on to the sea bed, which is the main reason why said known method is not applicable to deep sea beds. As the joint has to be made on the sea bed, it is immediately apparent that the two pipe portions have to be aligned and then kept perfectly aligned on the sea bed, that the free distance between the two pipe portions has to be measured accurately in order to determine the precise length of the central pipe stub to be used, and that the said central pipe stub of determined length has to be able to be guided and perfectly centred between the two aligned pipe portions. Furthermore, said central stub must be already provided at its ends with coupling sleeves which can be automatically and easily clamped in a sealed manner on to said pipe portions. In order to enable said coupling sleeves of the central pipe stub to be effectively and perfectly locked on to the two pipe portions, the ends of these latter must be welded, on the depot ship, to two pipe terminal pieces each provided with an external knurled surface band on which said coupling sleeve is clamped. Moreover, as the damaged portion of a pipe to be repaired can be of any length, the central pipe stub must not be allowed to have a length exceeding about 10 meters, which would make it necessary to use too bulky equipment for guiding and centering it between the two pipe portions, and for this reason a compensation pipe piece has to be welded on the depot ship between each pipe portion and the respective pipe terminal piece, this compensation piece having a length such that the free distance between the ends of said terminal pieces does not exceed 10 meters when the two pipe portions prepared in this manner on the depot ship face each other on the sea bed. As the two pipe portions after being prepared in this manner on the depot ship have to be relowered one after the other on to the sea bed by means of a releasable cable fixed to their ends, it is necessary to equip said terminal pieces with an automatically withdrawable discardable head to which to fix said releasable cable, said heads being used to protect said external knurled surface bands of the two terminal pieces before clamping to them the coupling sleeves of said central pipe portion. Having said discardable heads on the terminal pieces of the two pipe portions makes it necessary to withdraw them and recover them on to the depot ship before joining said central pipe stub between said terminal pieces.

Finally, as the work has to be carried out on deep sea beds and in the absence of divers, special apparatus must be used in order to automatically carry out the operations required by said method.

The present invention also provides specific apparatus by which said method can be rapidly, accurately and economically carried out. Said apparatus consists of a special discardable head which, provided at its nose end with means for fixing to it a discardable cable, is locked on to the end of a pipe terminal piece of a pipe portion to be repaired by means of a set of toothed locking wedges which, when moved radially by a double acting hydraulic cylinder, insert their teeth into the corresponding teeth in the outer knurled surface band of said pipe terminal piece, resilient bedding means being provided to prevent the teeth on said knurled surface from fracturing during said locking engagement, and which is thus perfectly protected, the head being automatically released by operating any one of the pushbuttons of four control slide valves for said double acting hydraulic cylinder, and which disposed at 90° to each other are easily accessible from the outside through corresponding bores in the head; an alignment framework which, equipped on its longitudinal axis at one of its longitudinal slots with two vertical supports in the form of a nose-shaped column to which are fixed two support cables by which the framework is lowered from the depot ship over the two pipe portions already prepared on the depot ship and laid on the sea bed, enables the two said prepared pipe portions to be coaxially aligned and kept aligned by means of two pairs of gripping clamps mobile both transversely and vertically and which, when clamped respectively to said pipe portions, thrust them under four inverted V fixed alignment supports, and also enables the free distance between the two said pipe portions to be determined accurately by means of a longitudinal graduated rod positionable between said pipe portions and along which two measuring carriages can be slid in respective opposite directions from a central initial mark on said rod to the free end of said prepared pipe portions; a service frame which, guided by said support cables for the alignment framework so that it inserts its ends into the two said vertical nosed column supports, bypassing through said longitudinal slot, by which means said frame, when in its working position, becomes rigid with said alignment framework, and being provided lowerly with two longitudinally slidable withdrawal and insertion carriages, each of which is provided with gripping clamps, with means for releasing a discardable head, and with means for locking a coupling sleeve of the central pipe stub on to the pipe terminal piece of a pipe portion, not only enables a central pipe stub provided at its ends with coupling sleeves to be guided and perfectly centered between the pipe terminal pieces of the two aligned pipe portions, but also enables the two discardable heads which close the pipe terminal pieces of the two pipe portions to be released, withdrawn and recovered on to the depot ship simultaneously, but also enables the two coupling sleeves of the central pipe stub to be locked simultaneously to said terminal pieces; and a special type of coupling sleeve which, slidably supported on the central pipe stub between the annular projection at one end thereof and an inner shouldering and mounted on the terminal piece of a pipe portion, is locked on to the end of said terminal piece by a set of toothed locking wedges which are moved radially so that they become inserted into the corresponding teeth on the external knurled surface band of said terminal piece from a thrust base which is displaced axially in its turn by said locking means provided on the two withdrawal and insertion carriages of the service frame, said thrust base being held in its attained position by one of its circular resilient segments which becomes inserted into a circumferential groove in the coupling sleeve, means being provided for providing a seal between said coupling sleeve and, respectively, said central pipe stub and said terminal piece of a portion of the pipe to be repaired.

More specifically, according to a characteristic of the present invention, the method for repairing, from a depot ship, a damaged pipe laid on deep sea beds comprises not only lowering an apparatus equipped for pipe recovery from a depot ship, guiding it and clamping it on to the pipe to be repaired, cutting the pipe at one end of its damaged piece by the cutting device of said apparatus, inserting and locking the composite sealing and recovery head of said apparatus into that end of the pipe portion which has been freed from the damaged part, freeing said apparatus and recovering it on board the depot ship, emptying the water which fills said pipe portion, raising the end portion of said pipe portion on to the depot ship by a recovery cable hooked to said composite sealing and recovery head, and releasing the raised end of said pipe portion from said composite sealing and recovery head on board the depot ship, but also then welding a compensation pipe piece to said raised end of the pipe portion on the depot ship and welding to the compensation pipe piece a pipe terminal piece comprising an outer knurled surface band, locking to the free end of said pipe terminal piece, on board the depot ship, a discardable and rapidly releasable head which covers and protects said outer knurled surface band of the terminal piece, relaying on the sea bed said end of the pipe portion prepared in this manner by means of a discardable cable hooked to said discardable head, releasing said discardable cable from said discardable head, repeating all the aforesaid stages required to free the other portion of the pipe to be repaired from said piece of damaged pipe, recovering and preparing on board the depot ship the end of said other pipe portion and relowering on to the sea bed said end of said other pipe portion also provided with a compensation pipe piece, a pipe terminal piece and a discardable head, then lowering an alignment framework from the depot ship on to the sea bed over the two said prepared pipe pieces by means of two support cables, the alignment framework being provided with mobile gripping clamps, fixed alignment supports for the pipe and a positionable device for determining the free distance between the two pipe portions, aligning the two said prepared pipe portions and keeping them aligned by clamping the two said pipe portions with said mobile gripping clamps of the framework and moving them on to said fixed alignment supports, filling the aligned pipe portions with water, lowering a service frame from the depot ship into a longitudinal slot in said alignment framework and guiding it by means of the two said support cables of said framework, the service frame being provided lowerly with two longitudinally slidable withdrawal and insertion carriages, each of which is provided with gripping clamps, means for releasing a discardable head and means for locking a coupling sleeve, moving the two carriages of said service frame on to the respective discardable heads of the two said aligned portions of the pipe to be repaired and clamping said heads with the gripping clamps of said carriages, releasing said discardable heads from the respective pipe terminal pieces of the two aligned pipe portions by said release means of the two carriages and withdrawing said discardable heads from said pipe terminal pieces by moving said carriages, recovering on board the depot ship said discardable heads thus freed by raising said service frame, positioning against the terminal pieces of the two aligned pipe portions said alignment framework device for determining the free distance between the two said pipe terminal pieces, returning said alignment framework device to its rest position, preparing on the depot ship a central pipe stub of the determined length, and provided at its ends with two quick locking coupling sleeves which can each slide thereon between an annular projection on the end of said stub and an inner shoulder ring at which the sleeve does not project from the stub, said coupling sleeves being also provided with means to provide a hermetic seal between them and, respectively, said central pipe stub and said terminal pieces of the portions of pipe to be repaired, locking said central pipe stub on to said service frame by tightening the gripping clamps of the two carriages of said service frame on to said coupling sleeves held against said inner shoulder rings, relowering said service frame fitted with said central pipe stub from the depot ship into said longitudinal slot in the alignment frame, while at the same time synchronously moving the two service frame carriages so that said central stub becomes centred between the terminal pieces of the two aligned pipe portions, mounting said coupling sleeves of the central pipe stub on to the respective terminal pieces of the two aligned pipe portions by sliding them as far as the respective annular projections on the ends of the central stub by moving the relative service frame carriages, locking said coupling sleeves of the central pipe stub against said outer knurled surface band of the respective terminal pieces of the two aligned pipe portions using said locking means of the respective carriages of said service frame, making the hermetic seal between said coupling sleeves and, respectively, said central pipe stub and said terminal pieces of the two aligned pipe portions by acting on said seal means of said coupling sleeves, releasing said coupling sleeves of the central pipe stub from the gripping clamps of the two carriages of said service frame and raising said service frame on to the depot ship, laying the joined pipe on to the sea bed by lowering said mobile gripping clamps of said alignment framework, releasing the joined pipe from said mobile gripping clamps of the alignment framework, and finally recovering said alignment framework on to the depot ship.

According to a further characteristic of the present invention, said quick release discardable heads, which have to be locked to the free ends of the terminal pieces of the two portions of pipe to be repaired and which have to cover and protect the outer knurled surface band of said terminal pieces are each constituted by a longitudinally mobile thrust base composed of a substantially cylindrical outer casing into one end of which there is inserted the terminal piece of one of the two portions of pipe to be repaired, and which is closed at its other end by a nose-shaped head provided with a pin for hooking the ring end of a discardable cable, and a fixed counter-thrust base situated inside said mobile thrust base and comprising a bedding sleeve into which said terminal piece is also inserted, and which comprises a guide for the longitudinal sliding of a vertical pin inside said mobile thrust base and is resiliently locked on one side of a vertical disc by a set of strong retention springs kept pressed between it and the nuts of an analogous set of bolts welded in a ring on to said side of the vertical disc, which is provided on its other side with a seal ring cooperating with the front edge of the end of said terminal piece, and with a cylindrical chamber insertable into said terminal piece and containing the cylinders for feeding the hydro-pneumatic system for operating a horizontal double acting hydraulic cylinder hinged at its ends between a support plate rigid with said mobile thrust base and a support plate welded to said side of the vertical disc of said fixed counter-thrust base; said mobile thrust base being also provided internally at the outer knurled surface band of said terminal piece inserted therein, with a circumferential set of longitudinal inclined surface slots of dovetail shape to slidably house a corresponding set of locking wedges with a toothed surface in the direction of said outer knurled surface band of said terminal piece, and are held resiliently pressed against the front edge of said bedding sleeve of said fixed counter-thrust base by a corresponding set of spring-loaded pushers housed in corresponding longitudinal cavities in said mobile thrust base, which is also provided with four bores disposed at 90° to each other, inside which are situated the pushbuttons of four slide valves for causing said double acting hydraulic cylinder to rapidly release the discardable head from the terminal piece.

Although the operation of the discardable head will be described in detail hereinafter, it is immediately apparent from the description that the head becomes locked and released by the inclined surface of the slots in said mobile thrust base which, in moving towards the right or left as a result of a similar movement of the thrust base by the double acting hydraulic cylinder, radially displaces the locking wedges so as to insert or withdraw their teeth into or from the corresponding opposing teeth of the outer knurled surface band of the terminal piece.

According to a further characteristic of the present invention, said alignment framework for aligning on the sea bed the two prepared portions of pipe to be repaired and keeping them aligned, for determining the free distance between said pipe terminal pieces of the two pipe portions and for guiding said service frame, is constituted by a long trellis of rectangular cross-section composed of two upper longitudinal beams of circular cross-section and two corresponding lower longitudinal beams of circular cross-section connected together vertically by uprights and horizontally by upper and lower cross-members, the trellis comprising in its upper middle portion a longitudinal slot, at the ends of which and coinciding with the longitudinal axis of the trellis there are provided two vertical nosed column supports connected upperly to the two framework support cables and welded lowerly to two brackets projecting from two lower cross-members of said trellis, there being also lowerly welded to said cross-members two fixed inverted V alignment supports, a further two fixed inverted V alignment supports being disposed on the longitudinal axis of the trellis by welding underneath two other lower cross-members situated respectively at the ends of said trellis, on which, on four of its uprights mounted in opposing pairs on one side of its centre line and on a further four of its uprights mounted in opposing pairs on its other side, there are mounted eight vertical guides in which eight vertical threaded square ingot screws can rotate driven by relative hydraulic motors, and which pass in pairs through the similarly threaded sleeves which, welded to the ends of four horizontal girders, are inserted into said vertical guides, each of said four horizontal girders, which can thus be moved vertically, being provided lowerly and over their entire length with two parallel racks which cooperate with the pinions of two hydraulic motors mounted opposing said horizontal girder on a bridge carriage which is thus movable in both directions along said horizontal girder and thus transversely to said trellis by means of four pairs of rocking wheels which rest respectively in pairs on the two flanges of an inverted T beam welded below said horizontal girder, said bridge carriage being also provided lowerly with a central longitudinal saddle for a pipe portion, and, to the sides of said central saddle, with two parallel longitudinally directed pins on which are hinged the two jaws of a gripping clamp, which are operated by four double acting hydraulic cylinders hinged two on one side of said carriage and two on the other side, between the ends of said jaws and a support rigid with said carriage respectively, said trellis being finally provided with a positionable device for determining the free distance between the two terminal pieces of the two aligned portions of the pipe to be repaired.

According to a preferred embodiment of the present invention, said positionable device provided on said trellis constituting the alignment framework for determining the free distance between the two terminal pieces of the two aligned portions of the pipe to be repaired, is constituted by a horizontal graduated rod disposed longitudinally which, fitted at its ends with two levers hinged to the base of two uprights of said trellis so that they correspond with said slot in said trellis and are below and between the terminal pieces of the two aligned portions of the pipe to be repaired, can be rotated and positioned against the two said terminal pieces by two hydraulic double acting cylinders hinged respectively between said levers and said lower longitudinal beam of said trellis to which the two said uprights are welded, said rod being provided with a central projecting mark, a rack disposed over its entire length and two slider carriages which can slide along said rod in opposite directions from said central mark, each by means of a toothed wheel of which the number of revolutions made can be measured and which, engaging with said rack, is rotated by a hydraulic motor provided on each carriage, which in its turn stops only when one of its impact portions, provided with a lever switch for stopping said motor, collides against the front end of a terminal piece of the two aligned portions of the pipe to be repaired.

In this manner, said determination can be made in two different ways, i.e. directly by reading from a service submarine the number of marks indicated on the graduated rod between the ends of the two terminal pieces, or indirectly by using the measured number of revolutions made by the two toothed measuring wheels of the two said slider carriages in going from the central mark to the ends of the two terminal pieces, these values being obviously proportional to the distances travelled by said toothed wheels, this second method being applied in particular when operating on muddy sea beds where the sea current can give rise to turbulence which can obstruct direct viewing of the markings on the graduated rod.

According to a further characteristic of the present invention, said service frame for releasing and recovering on to the depot ship said discardable heads fixed to the terminal pieces of the two aligned portions of the pipe to be repaired, for lowering from the depot ship and centering a central pipe stub between the two said terminal pieces and for inserting and locking the coupling sleeves of said central pipe stub on to said terminal pieces, is constituted by a frame of triangular cross-section insertable into said slot in said alignment framework and composed of an upper longitudinal beam of circular cross-section provided upperly with two lugs for a support cable, and two lower longitudinal beams of circular cross-section connected together by rods and fitted at their longitudinal ends with two openable vertical sleeves through which said support cables for the alignment framework pass and into which said two nose-shaped vertical column supports of said framework fit, to said frame there being lowerly fixed a longitudinal double T beam along which can slide two withdrawal and insertion carriages each constituted by a double bridge structure slidably supported on both sides of said double T beam by four rocking wheel pairs which are inserted between the flanges of said beam on the opposing sides and rest in pairs on the two lower flanges of the beam, and is driven by two hydraulic motors mounted on the two longitudinal sides of the structure, their pinions engaging respectively in two parallel longitudinal racks welded under said lower flanges of said double T beam, said double bridge structure being further provided lowerly with a central longitudinal saddle and, to the sides of said central saddle, with two longitudinal parallel tubes emerging from both the front faces of the structure, at their centres, i.e. between the two bridges of the double bridge structure, there being rotatably mounted the two respective pairs of jaws of two gripping clamps which are each operated by two hydraulic double acting cylinders hinged between the ends of the jaws and said double bridge structure, means for releasing a discardable head being mounted on the ends of said tubes which emerge from the double bridge structure which face the other withdrawal and insertion carriage, whereas on the other projecting ends of said tubes there are mounted means for locking a coupling sleeve.

Said means for releasing a discardable head, which are mounted on the facing ends of said tubes projecting from the two withdrawal and insertion carriages of said service frame consist, according to a further characteristic of the invention, of an arcuate support bridge which is fixed by its ends to said ends of the tubes, and comprises on one of its front faces an arcuate dovetail shaped groove which rotatably supports the second arcuate bridge disposed coaxially to the first fixed support bridge and is provided on its outer surface with an arcuate rack and two hydraulic cylinders disposed at 120° apart, their piston rods emerging from the inner arcuate surface of said second arcuate bridge through corresponding bores provided therein, said second arcuate bridge being rotated by two hydraulic motors mounted on said first fixed arcuate support bridge, the pinions of these motors engaging with said rack of said second arcuate bridge.

In this manner, by rotating said second arcuate bridge with said hydraulic motors, it is possible to make one or other of the two said hydraulic cylinders of said second bridge overlie one of the four said bores disposed at 90° apart in the discardable head, so that the piston rod of said hydraulic cylinder can penetrate into said bore and thus act on the relative control pushbutton of the double acting hydraulic cylinder of the discardable head in order to release it.

According to a further characteristic of the present invention, said means for locking a coupling sleeve, which are mounted on said other ends of said tubes projecting from the two withdrawal and insertion carriages of said service frame, consist of an arcuate locking bridge mobile longitudinally, its ends being fixed respectively to the piston rods of two horizontal double acting hydraulic cylinders which are fixed inside said other ends of the tubes, said mobile locking bridge being provided on its inner arcuate surface with an arcuate groove arranged to cooperate with a similar arcuate projection on the thrust base of a coupling sleeve.

Finally, according to a further characteristic of the present invention, said coupling sleeves slidably supported on a central pipe stub, each between an annular projection on the end of said stub and an inner shoulder ring, and provided with hermetic seal means, said coupling sleeves having to be mounted respectively over the terminal pieces of the two aligned portions of the pipe to be repaired and locked against said outer knurled surface bands of said terminal pieces, are each constituted by a counter-thrust base comprising a cylindrical hollow member bolted longitudinally at that end facing the other coupling sleeve to a fastening ring, and at its other end to a union which comprises internally two circumferential cavities at its said ends, and, in its middle part, a circumferential ledge arranged to cooperate with said annular projection on the ends of the stub, and a mobile thrust base in the shape of a hollow cylinder which, partly inserted longitudinally into said union of the counter-thrust base, comprises at its free end an arcuate projection arranged to cooperate with said corresponding inner groove of said mobile locking bridge of the withdrawal and insertion carriages of said service frame, and in inner lead-in bevel to facilitate its said mounting on the respective terminal piece, and, on its outer surfce inserted into said union, a circumferential groove for housing a resilient circular segment arranged to snap-insert into a corresponding circumferential groove provided more internally on the inner surface of said union in order to lock in position said mobile thrust base when moved towards said counter-thrust base, and is also provided, internally at its other end inserted into said union, with a circumferential set of longitudinal inclined surface slots of dovetail shape which slidably house a corresponding set of locking wedges having a toothed surface arranged to cooperate with said outer knurled surface band of said terminal piece, and are maintained resiliently pressed against the inner front rear face of said union by a corresponding set of spring-loaded pushers and housed in corresponding longitudinal cavities in said mobile thrust base, said hermetic seal means being constituted by two packs of rubber rings interposed with steel rings which, housed respectively in said circumferential cavities of said hollow cylindrical member of the counter-thrust base, are pressed on one side by two annular sets of hydraulic pistons disposed at the ends of an annular set of longitudinal channels provided in said hollow cylindrical member of the counter-thrust base, and connecting together the two said circumferential cavities, which are connected together by two vertical annular channels also provided in said hollow cylindrical member of the counter-thrust base and emerge therefrom by way of a respective inlet nozzle provided with a shutoff valve for the forced injection of a pressurised resinous compound into all said channels, and with an outlet nozzle also provided with a shutoff valve for discharging the containing oil with which all said channels are prefilled.

From the aforesaid, it is apparent that whereas the coupling sleeves are locked on to the outer knurled surface bands of the terminal pieces of the two aligned portions of the pipe to be repaired in a manner substantially similar to the already described locking of the discardable heads on to said outer knurled surface bands, with the exception that the mobile thrust base is not moved hydraulically in this case directly by a double acting hydraulic cylinder, but indirectly by the mechanical action of members of the service frame, in contrast the hermetic seal is made by using the articulated arms of a service submarine to connect a pipe from said inlet nozzle to an injection system for said pressurised resinous compound, which can be mounted either on the submarine or on the depot ship or on the service frame, in which case said connection pipe can be previously connected to the inlet nozzle of the coupling sleeves on the depot ship, then pressure-injecting said pressurised resinous compound into said connected channels until the oil contained therein has completely emerged from said outlet nozzle, then tightly closing the shutoff valve in said outlet nozzle either by the articulated arms of said service submarine or by remote control from the depot ship, and continuing to inject said pressurised resinous compound until a predetermined pressure is created in said channels to urge the two said annular sets of hydraulic pistons to compress the two said packs of rubber rings interposed with steel rings such that said rubber rings expand radially to create the required seal, the hermetic effect of which is further increased by the fact that after a little time said resinous compound solidifies, so completely closing each channel and each interstice.

The invention and its specific method of operation will be more apparent with reference to the accompanying drawings illustrating a preferred embodiment thereof given by way of non-limiting example, in that technical or constructional modifications can be made thereto without leaving the scope of the present invention.

In said drawings:

FIG. 1a to 1m are diagrammatic longitudinal side views showing the successive stages ot the method for repairing, from a depot ship, a damaged pipe laid on deep sea beds, according to the present invention;

FIG. 2 is a partly sectional longitudinal view of the free end of one of the two portions of the pipe to be repaired, after being prepared on board the depot ship, according to the invention;

FIG. 3 is a longitudinal side section, with certain parts shown non-sectioned, through the quick release discardable head according to the invention, already locked on to the free end of FIG. 2;

FIG. 4 is a cross-section through said discardable head on the line AA of FIG. 3, in which the locking wedges are not shown for clarity reasons;

FIG. 5 is a longitudinal side view of the alignment framework according to the invention, already laid over the two prepared portions of the pipe to be re-paired;

FIG. 6 is a longitudinal plan view of the alignment framework of FIG. 5;

Figure 10:
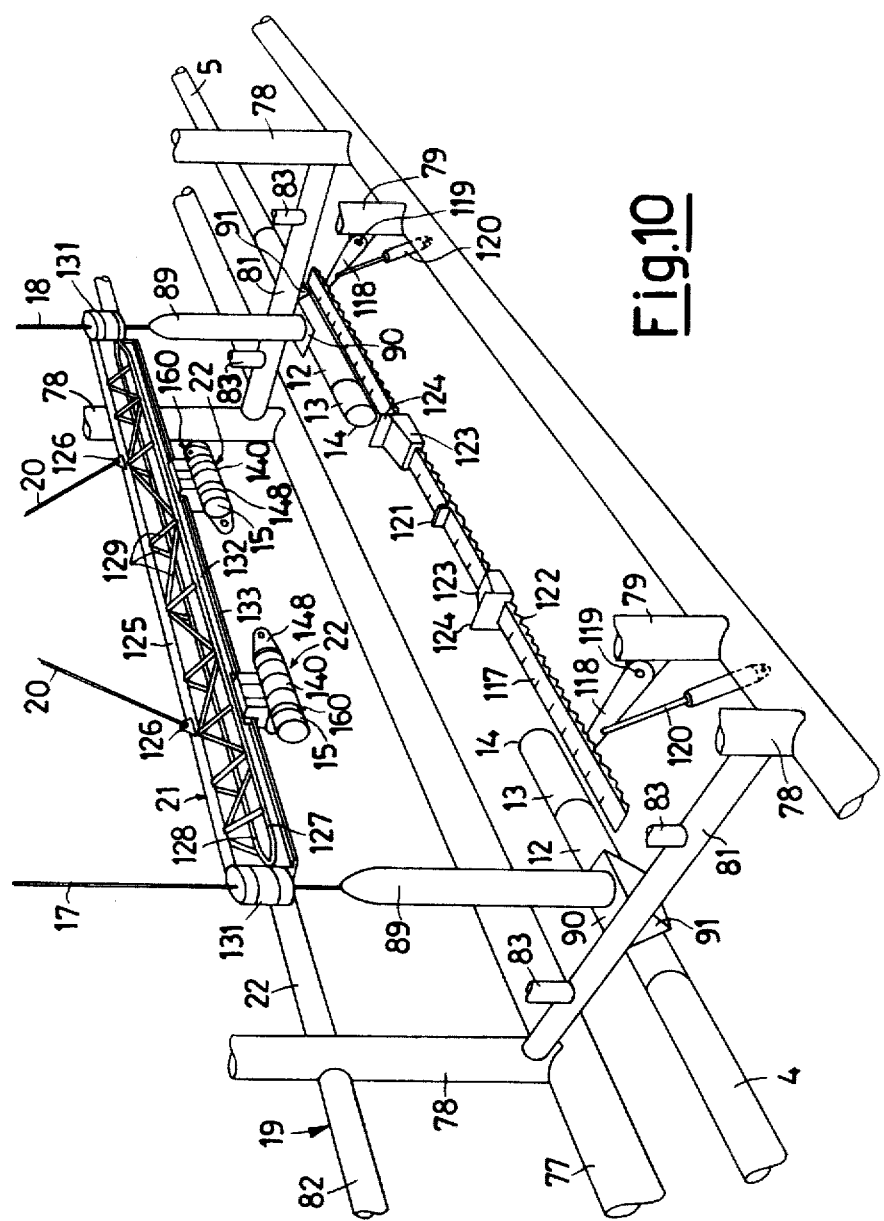
Figure 15:
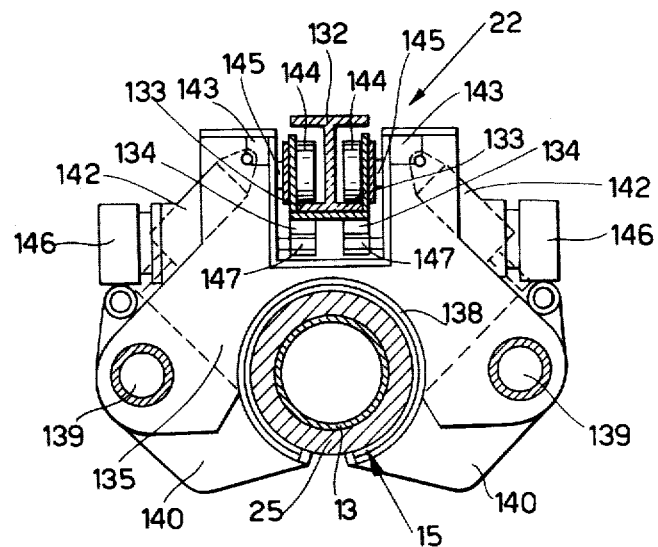
Figure 16:
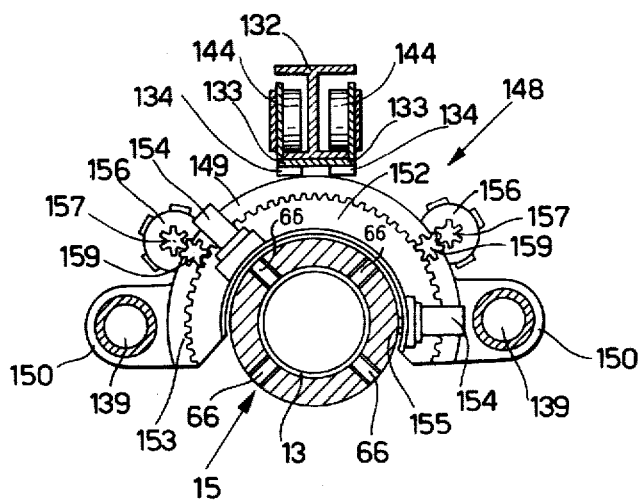
Figure 19:
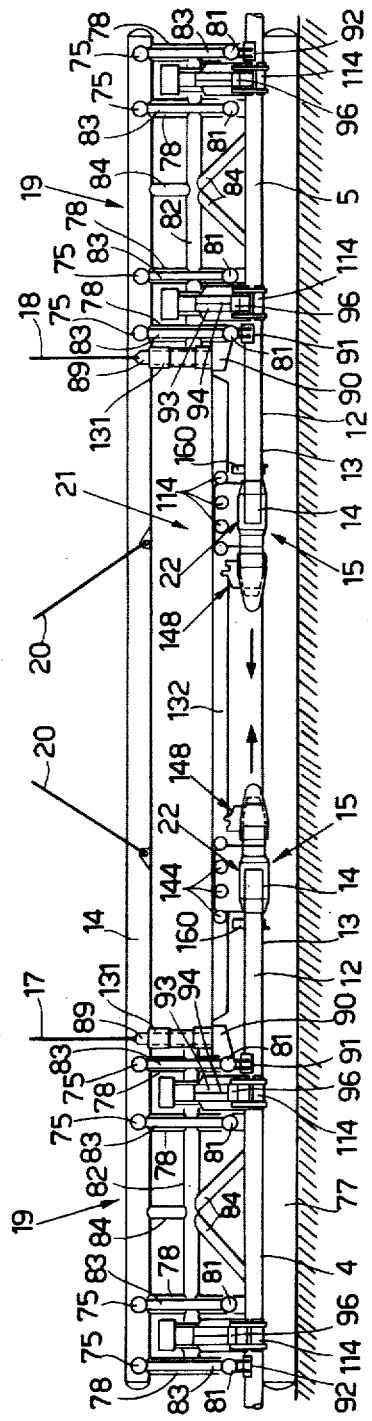
Figure 20:
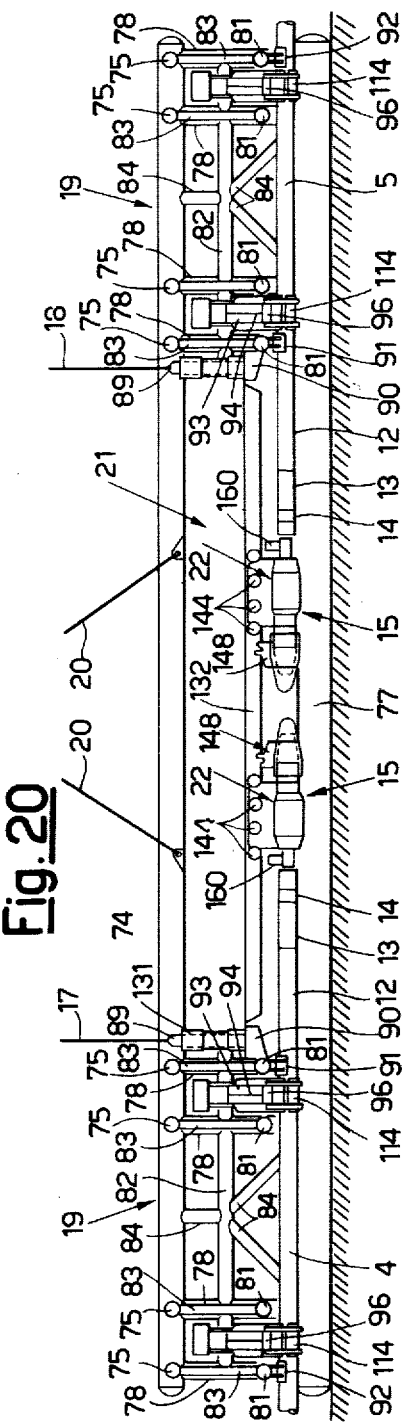

FIG. 10 is a diagrammatic partial perspective view of said alignment framework showing the positionable device for determining the free distance between the two terminal ends of the two aligned portions of the pipe to be repaired, according to the invention, and of the service frame according to the invention, as this latter is about to be raised on board the depot ship with the two discardable heads;

FIG. 11 is a longitudinal side view of said service frame according to the invention;

FIG. 12 is a longitudinal plan view of the service frame of FIG. 11;

FIG. 13 is a section on the line DD of FIG. 11;

FIG. 14 is a partly sectional longitudinal side view to an enlarged scale, of a withdrawal and insertion carriage according to the invention of said service frame, already clamped on to a discardable head;

FIG. 15 is a cross-section through said withdrawal and insertion carriage on the line EE of FIG. 14;

FIG. 16 is a cross-section through said withdrawal and insertion carriage on the line FF of FIG. 14, i.e. a front view of the means for releasing a discardable head of said carriage;

FIG. 17 is a longitudinal side section through a coupling sleeve for the central pipe stub according to the invention, already mounted but not locked on to the terminal piece of a portion of the pipe to be repaired;

FIG. 18 is a longitudinal side section, to an enlarged scale, through the hermetic seal means for said coupling sleeve according to the invention;

FIG. 19 is a central longitudinal diagrammatic sectional view illustrating that stage of the method according to the invention in which the two service frame carriages are brought and locked on to the discardable heads of the two prepared portions of the pipe to be repaired which are kept aligned by the alignment frame;

FIG. 20 is a central longitudinal diagrammatic sectional view illustrating the stage after that illustrated in FIG. 19, in which the two discardable heads, released from the outer knurled surface bands of the respective terminal pieces of the two said aligned portions of the pipe to be repaired by the release means of said service frame carriages, are withdrawn by these latter from said terminal pieces;

FIG. 21 is a central longitudinal diagrammatic sectional view illustrating that stage of the method according to the invention in which the two coupling sleeves of the central pipe stub, having been gripped by the two service frame carriages, are about to be mounted by these latter on to the respective terminal pieces of the two prepared portions of the pipe to be repaired which are kept aligned by the alignment framework;

FIG. 22 is a central longitudinal diagrammatic sectional view illustrating the stage after that illustrated in 21, in which the two coupling sleeves, mounted on the respective terminal pieces by said service frame carriages, are locked on to the outer knurled surface bands of said terminal pieces by the clamping means of said service frame carriages.

Figure 1G:
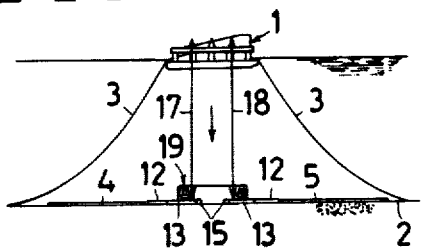
Figure 1H:
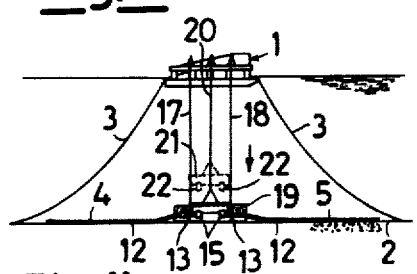
Figure 1I:
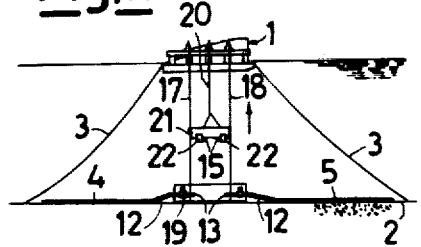
Figure 1L:
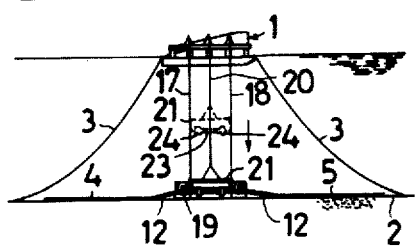
Figure 1M:
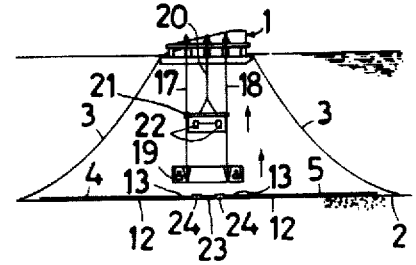
Figure 7:
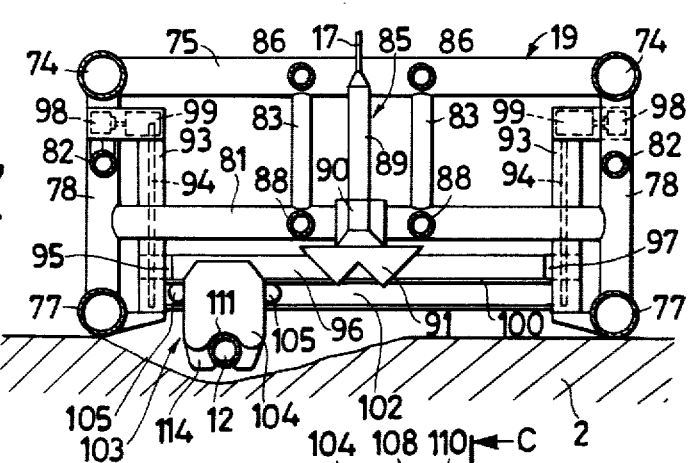
FIG. 7 is a cross-section through said alignment framework on the line BB of FIG. 5.
Figure 8:
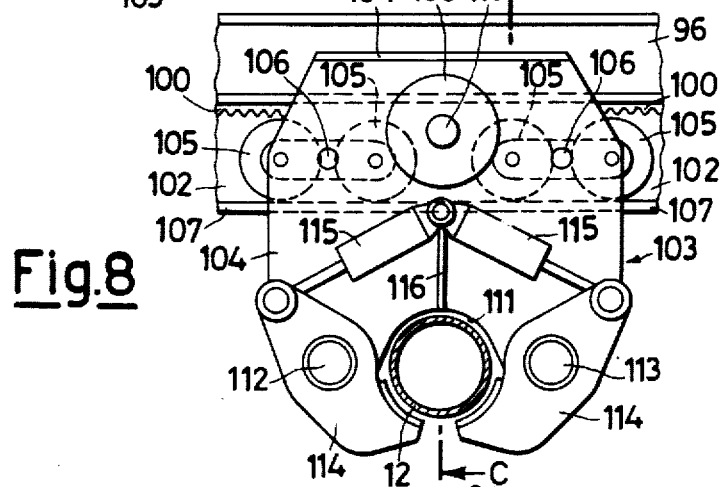
FIG. 8 is a longitudinal side view to an enlarged scale of a bridge carriage, according to the invention, of said alignment framework, said bridge carriage being shown uncovered.
Figure 9:
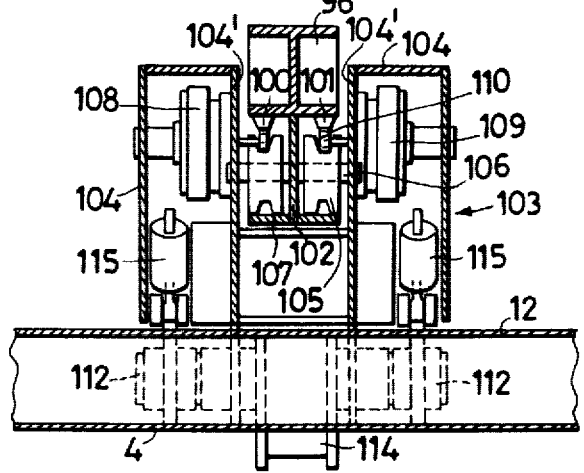
FIG. 9 is a cross-section through said bridge carriage on the line CC of FIG.8.

With reference to the figures, in which corresponding elements are indicated by the same reference numeral, and in particular with reference to FIGS. 1a to 1m, these show a depot ship 1 anchored on the sea bed 2 by anchoring cables 3 connected to anchors, not shown on the figure. The operations must be performed from the depot ship for repairing a damaged pipe laid on said sea bed 2, this damaged pipe therefore consisting of the two good pipe portions 4 and 5, which are connected together by the damaged pipe piece 6. For this purpose, an apparatus 9 is lowered from the depot ship 1 on to the end of the good portion 4 of said pipe by means of a support cable 7 and guided by two guide cables 8 stretched between the depot ship and said pipe portion 4 (see FIG. 1a,) this apparatus being fitted for pipe recovery, for example as described in our previous U.S. Patent Application Ser. No. 770,854 filed on Feb. 22, 1977 or as described in our other previous U.S. Patent Application Ser. No. 21,949 filed on Mar. 19, 1979, by means of which said pipe portion 4 is cut and then freed from the damaged piece of pipe 6. A composite sealing and recovery head 10 is then inserted and locked into the end of the pipe portion 4 freed in this manner.

Said apparatus 9 is then recovered on board the depot ship 1 (see FIG. 1b), and a recovery cable 11 is hooked on to the sealing and recovery head 10 and is lowered from the depot ship 1 in order to raise the end of the portion 4 of the pipe to be repaired on to the depot ship 1 (see FIG. 1c) after emptying the water which fills the portion 4. Said composite sealing and recovery head 10 is then removed from the raised end of said portion 4, and said raised end is then welded to a compensation pipe portion 12 which is itself welded to a pipe terminal piece 13 having an outer knurled surface band 14 (see FIG. 2) on which a quick release discardable head 15 is locked (see FIG. 1d). After this, the end of the pipe portion 4 thus prepared on the depot ship 1 is relowered on to the sea bed 2 by a discardable cable 16 (see FIG. 1e) hooked to said head 15, and all the foresaid operations are repeated to free the other portion 5 of the pipe to be repaired from said piece of damaged pipe 6, to recover and prepare on board the depot ship 1 the end of said pipe portion 5, and to relower on to the sea bed 2 said end of the pipe portion 5 provided with a compensation pipe portion 12, a terminal piece 13 and a quick release discardable head 15 locked on to the outer knurled surface band of said terminal piece 13 (see FIG. 1f). At this point, an alignment framework 19 (see FIG. 1g) is lowered from the depot ship 1 on to the sea bed 2 over the two prepared portions 4 and 5 of the pipe to be repaired by means of the two support cables 17 and 18. By means of the alignment framework, the prepared ends of the two pipe portions 4 and 5 are gripped, lifted from the sea bed 2 and brought into mutual alignment between fixed alignment supports in said framework (see FIG. 1h), and after the two aligned portions 4 and 5 of the pipe to be repaired have been filled with water, a service frame 21 (see FIG. 1h) is lowered from the depot ship into a longitudinal slot in said alignment framework 19 by means of a support cable 20 and being guided by the two said support cables 17 and 18 of said alignment framework 19. The service frame 21 is provided lowerly with two withdrawal and insertion carriages 22 from which the two said quick release discardable heads 15 of the two pipe portions 4 and 5 are respectively gripped (see FIG. 19), unlocked and withdrawn from the respective terminal pieces 13 of the two said pipe portions 4 and 5 (see FIG. 20) and finally simultaneously recovered on board the depot ship 1 by raising said service frame 21 (see FIG. 1i and FIG. 10). After this, said service frame 21 is again lowered from the depot ship 1 into said longitudinal slot of said alignment framework 19 after having loaded the frame with a central pipe stub 23 (see FIG. 11) provided at its end with two mobile quick clamping coupling sleeves 24 and having a length equal to the free distance between the two terminal pieces 13 of the two pipe portions 4 and 5, this distance having previously been determined by a positionable measuring device in said alignment framework 19. Said central pipe tube 23 is centred between the two said pipe terminal pieces 13 by suitably sliding the two said carriages 22 of the service frame 21 synchronously with each other, these being locked respectively on to said mobile coupling sleeves 24 of the central pipe stub 23 (see FIG. 21). After this, said sleeves 24 are mounted by said carriages 22 over the respective pipe terminal pieces 13, and are locked on to the outer knurled surface bands 14 of said pipe terminal pieces (see FIG. 22). Finally, after having made the hermetic seal by pressure-injecting a pressurised resinous compound into an inlet nozzle of the two said coupling sleeves 24, and having released the service frame 21 from said coupling sleeves and the alignment framework 19 from the pipe prepared in this manner, said service frame 21 and said alignment framework 19 are recovered on board the depot ship 1 (see FIG. 1m).

Said quick release discardable head 15, which has to be locked on to the outer knurled surface band 14 of each of the two terminal pieces 13 of the two portions 4 and 5 of the pipe to be repaired, are illustrated in detail in FIGS. 3 and 4.

Said head 15 comprises a thrust base consisting of a substantially cylindrical outer hollow casing 25, into the front end of which is inserted the terminal piece 13 of one of the two portions 4 or 5 of the pipe to be repaired, while its other end is closed by a nose-shaped head 26 provided with a pin 27 for hooking to the ring terminal 28 of said discardable cable 16. A support track 29 is welded on to a rib 28 in said thrust base 25-26 at said nose-shaped head 26, and to it there is hinged the rod 30 of the piston 31 of a horizontal double acting hydraulic cylinder 32 which is hinged to a support plate 33 welded to one side of a vertical disc 34 on which there is welded an annular set of bolts 35 on which a like set of strong return springs 36 are pressed by corresponding nuts 37 against the annular rear surface 38 of a bedding sleeve 39 into which said pipe terminal piece 13 is inserted and which is thus resiliently locked to said vertical disc 34 with which it constitutes the fixed counter-thrust base, with respect to which said thrust base 25-26 can be moved longitudinally by the action of said double acting hydraulic cylinder 32, rotation being prevented by a vertical internal pin 40 in said mobile thrust base 25-26 which is inserted into a longitudinal guide 41 in said bedding sleeve 39 of said fixed counter-thrust base. On its other side, said vertical disc 34 of the fixed counter-thrust base is provided with a seal ring 42 with which it presses against the front edge of the end of said pipe terminal piece 13, and with a cylindrical chamber 43 which is inserted into said pipe terminal piece 13 and supports internally, by support brackets 44, the cylinder 45 for feeding the hydropneumatic system for operating said double acting hydraulic cylinder 32. Said hydropneumatic system consists of a conduit 46 provided with a shutoff valve 47, which connects said cylinders 45 respectively to a conduit 48 which communicates with the active chamber 51 of said double acting hydraulic cylinder 32 by way of control slide valve 49 provided with a tube discharging to the outside 50, and to a conduit 52 connected to four conduits 53, 54, 55 and 56 connected together and disposed at 90° to each other, which flow together through their control slide valves 57, 58, 59 and 60 (in FIG. 3 the control slide valve 60 is not visible as it is opposite the control slide valve 59). These are generally closed and can be opened by pressing the respective pushbuttons 61 (in FIG. 3 only two of the four pushbuttons are visible, the other two being perpendicular to the former) in the single conduit 62 which is connected to said control slide valve 49 by way of the conduit 63, and to the second active chamber 64 of said double acting hydraulic cylinder 32 by T coupling 65.

The said four pushbuttons 61 of the control slide valves 57, 58, 59 and 60 which are disposed at 90° to each other are accessible from the outside of the discardable head 15 through four corresponding bore 66 (only two bores are visible in FIG. 3) provided at 90° to each other in said hollow cylindrical casing 25 of the mobile thrust base, which is provided on its inner surface in a position corresponding with the outer knurled surface band 14 of the pipe terminal piece 13 inserted in it, with a circumferential set of longitudinal inclined slots of dovetail shape 67 (see FIG. 4) which slidably support a corresponding set of locking wedges 68 (see FIG. 3) having a toothed surface 69 facing said outer knurled surface 14 of said terminal piece 13 and which are kept resiliently pressed against the front edge 70 of said bedding sleeve 39 of the fixed counter-thrust base by a corresponding set of pushers 71 loaded by springs 72, and housed in corresponding longitudinal cavities 73 provided circumferentially in said hollow cylindrical casing 25 of the mobile thrust base and opening into said slots 67.

The operation of such a discardable head 15 is immediately apparent.

The head is mounted over the pipe terminal piece 13 until the seal ring 42 of the vertical disc 34 of the fixed counter-thrust base abuts against the front edge of the end of said pipe terminal piece 13, so ensuring that the locking wedges 68 face the outer knurled surface band 14 of the pipe terminal piece 13. The active chamber 51 of the double acting hydraulic cylinder 32 is fed with the drive fluid from the cylinders 45 while keeping the control slide valves 57, 58, 59 and 60 closed, and the mobile thrust base 25-26 is moved longitudinally towards the right (see FIG. 3) by said hydraulic cylinder 32.

As the mobile thrust base 25-26 and consequently the inclined surfaces of its longitudinal slots 67 move towards the right, the locking wedges 68 are moved radially towards the inside of the head, and insert the teeth of their toothed surfaces 69 into the corresponding teeth in the outer knurled surface band 14 of the pipe terminal piece 13, so locking the head 15 on to said pipe terminal piece 13. As said locking wedges are guided in their radial movement by the front edge 70 of the bedding sleeve 39, and as this latter is locked resiliently to the vertical fixed disc 34 and thus can make minimum longitudinal displacements relative to this latter, any deterioration of the teeth of said outer knurled surface band 14 due to their imperfect meshing with the corresponding teeth of the toothed surface 69 of the locking wedges 68 is prevented. In this respect, if there should be any point contact between said teeth, the slight displacement allowed by the bedding sleeve 39 brings the teeth of the wedges 68 into perfect meshing with the teeth of the outer knurled surface band 14. To unlock the discardable head 15, any of the four pushbuttons 61 is pressed by means of a rod or plunger inserted into the corresponding bore 66 in the hollow cylindrical casing 25 of the mobile thrust base. If for example the pushbutton 61 of the control slide valve 58 is pushed (see FIG. 3), this control slide valve is opened to allow the drive fluid from the cylinders 45 to pass from the conduits 52 and 54 into the conduit 62, and from here to the other active chamber 64 of the hydraulic double acting cylinder 32, and to act by way of the conduit 63 on the control slide valve 49 so as to block entry of the drive fluid contained in the conduit 48 into the active chamber 51 of the hydraulic cylinder 32, and to simultaneously connect said active chamber 51 to the external discharge tube 50. In this manner, the mobile thrust base 25-26 is moved longitudinally in the opposite direction to the preceding, i.e. towards the left, by said double acting hydraulic cylinder 32, and the locking wedges 68 are thus moved radially outwards from the head and separate from said outer knurled surface band 14 of the pipe terminal piece 14.

The alignment framework 19 used in the method according to the present invention is illustrated in detail in FIGS. 5, 6, 7, 8, 9 and 10, and 19 to 22.

Said framework 19 consists of a long trellis of rectangular cross-section composed of two upper longitudinal beams of circular cross-section 74, connected together by the upper cross-members 75 and stiffening beams 76 (see FIG. 6 in which the two prepared portions 4 and 5 of the pipe to be repaired are shown strongly misaligned to emphasise that the misalignment between the ends of the discardable heads 15 of the two said pipe portions can even be almost equal to the useful width of the alignment framework), and by two corresponding lower longitudinal beams of circular cross-section 77 connected vertically to the former by pairs of main uprights 78 and by secondary uprights 79 and 80, and are connected horizontally together by the lower cross-members 81 (in FIG. 6 said cross-members are not visible as they lie perfectly below the corresponding upper cross-members 75). Said trellis, which is strengthened by horizontal cross-members 82 which connect together the uprights of each side of the trellis, by vertical cross-members 83 connecting the upper cross-members 75 to the corresponding lower cross-members 81 (see FIGS. 7 and 10) and by strengthening beams 84, comprises a longitudinal slot 85 (see FIG. 6) in its upper middle portion along its longitudinal axis. Said service frame 21 is inserted into said slot 85, which is bounded by two longitudinal upper beams 86 welded at their ends on to two upper cross-members 75 respectively, and are connected respectively to said upper longitudinal beams 74 by cross-members 87 and by two corresponding lower longitudinal beams 88 (see FIG. 7) welded at their respective ends on to two lower cross-members 81. Two vertical nose-shaped column supports 89 are provided at the ends of said longitudinal slot 85 on the longitudinal axis of the framework 19, and are connected at their top to the two said support cables 17 and 18 for the alignment framework 19, and are welded at their bottom to two brackets 90 projecting from two lower cross-members 81 below which two fixed inverted V alignment supports 91 are welded on the longitudinal axis of the frame 19. A further two fixed inverted V alignment supports 92 are welded on said longitudinal axis of the framework 19 to the underside of the two lower cross-members 81 at the ends of said framework 19. The framework 19 is provided with eight vertical guides 93 at its four pairs of main uprights 78 disposed in opposing pairs on one side of its centre line, and at its other four pairs of main uprights 78 disposed in opposing pairs on the other side. The vertical guides 93 are welded at their top on to said cross-members 82 which connect together the two main uprights 78 of each pair, and at their bottom to said lower longitudinal beams 77. In each of these vertical guides 93 there is rotatably supported a vertical square ingot threaded screw 94 (see FIG. 7) which passes through a threaded sleeve 95 inserted in said vertical guide and welded to one end of a horizontal girder 96, to the other end of which there being welded a similar threaded sleeve 97 inserted into the vertical guide 93 opposite the preceding, and traversed by the vertical screw 94 of this latter vertical guide.

Said eight vertical screws 94 are each rotated, to move the four horizontal girders 96 vertically, by a hydraulic motor 98 coupled to a reduction gear 99 engaged with said vertical screw, the hydraulic motors 98 relative to opposing vertical screws being mutually synchronised. Each of said four vertically mobile horizontal girders 96 is provided lowerly over its entire length with two parallel racks 100 and 101, and with an inverted T beam 102 which acts as a guide for a carriage 103 which can move in both directions along said horizontal girder, and thus transversely to the alignment frame 19. Each of said four carriages 103 consists of a bridge structure 104 (see FIG. 8 and 9) which is mounted over said inverted T beam 102 and is movably supported thereby by means of four rocking pairs of grooved wheels 105 which are hinged externally in pairs by the pins 106 on the two inner sides 104' of the bridge of said bridge structure 104, and rest respectively on the two flanges 107 of said inverted T beam 102. Said bridge structure 104 is driven by two hydraulic motors 108 and 109 which are mounted on the two said inner sides 104' so that their pinions 110 engage in said parallel racks 100 and 101 of the horizontal girder 96. The structure 104 comprises a lower central saddle 111 for one of the portions 4 or 5 of the pipe to be repaired, and, to the sides of said saddle 111, two parallel longitudinal through pins 112 and 113 on which are hinged the two jaws 114 of a gripping clamp which is operated by four double acting hydraulic cylinders 115, two of which are hinged on to one side of the bridge structure 104 and two on to the other side, between the respective ends of said jaws 114 and a support 116 welded vertically to said inner sides 104' of the bridge structure 104. The alignment framework 19 is provided with a positionable device for measuring the free distance between the two terminal pieces 13 of the two portions 4 and 5 of the pipe to be repaired. Said device substantially consists (see FIG. 6 and particularly FIG. 10) of a horizontal graduated rod 117 disposed longitudinally to the frame 19, and fitted at its ends with two levers 118 hinged at their other end by pins 119 to brackets welded to the base of the two said secondary uprights 79, which are welded to one of said lower longitudinal beams 77 of the framework 19. In this manner, the graduated rod 117 is situated in a position corresponding with said longitudinal slot 85 in the framework 19 and below and between the terminal pieces 13 of the two aligned portions 4 and 5 of the pipe to be repaired. Said graduated rod 117, which can be rotated and positioned against the two said terminal pieces 13 by two hydraulic double acting cylinders 120 hinged between said levers 118 and said lower longitudinal beam 77 respectively, is provided upperly with a central projecting mark 121, and lowerly with a rack 122 disposed over its entire length, and also supports two slider carriages 123 which can be slid along said rod in opposite directions from said central mark 121, each by means of a toothed measuring wheel not shown in the figure, which measures the number of revolutions which it makes, and which engages with said rack 122 of the graduated rod 117, to be rotated by a hydraulic motor provided on each carriage and not shown in the figure. Said hydraulic motor is stopped only when an impact piece 124 of each carriage 123, provided with a lever switch, not shown in the figure, for stopping said motor, strikes against the front end of one of the terminal pieces 13 of the two aligned portions 3 and 4 of the pipe to be repaired. The number of revolutions made and measured by said toothed measuring wheels of the two slider carriages 123 in bringing said carriages from said central mark 121 on the graduated rod 117 to said front ends of the terminal pieces 13 are then transmitted to the depot ship 1 by means not shown on the figure.

The method of operating said alignment framework 19 is now apparent.

The framework 19 is lowered from the depot ship 1 on to the sea bed 2 over the two already prepared portions 4 and 5 of the pipe to be repaired. The hydraulic motors 108 and 109 of the two carriages 103 to the left of the framework and the two carriages 103 to the right of the framework are operated, so that the former slide along their horizontal girders 96 to become positioned over the portion 4 of the pipe to be repaired, and the latter slide likewise over the pipe portion 5. The hydraulic motors 98 are then operated to lower said girders 96 and the carriages 103 until the two pipe portions 4 and 5 are not inserted into the saddles 111 of the respective carriages 103, the jaws 114 of the gripping clamps of said carriages 103 being open. Said jaws 114 of the gripping clamps of the carriages 103 are then tightened around the respective pipe portions 4 and 5 by operating the four double acting hydraulic cylinders 115 of each carriage, and the hydraulic motors 108 and 109 and the hydraulic motors 98 are then operated again in order to insert the pipe portions 4 and 5 into the fixed inverted V alignment supports 91 and 92 of the framework 19, where they are kept mutually aligned. After the discardable heads 15 have been extracted from the terminal pieces 13 of said pipe portions 4 and 5, the double acting hydraulic cylinders 120 are operated to position the graduated rod 117 against said terminal pieces 13 and thus read the number of markings on said graduated rod between the ends of said terminal pieces. If said markings are only poorly visible, the hydraulic motors of the two slide carriages 123 are operated to determine the free distance between the two terminal pieces in the form of the number of revolutions of the toothed measuring wheels of said carriages.

All the aforesaid operations are carried out by remote control from the depot ship 1.

FIGS. 10 to 16 show in detail the service frame 21 which, according to the invention, is used in cooperation with said alignment framework 19.

Said service frame 21 comprises a frame of triangular cross-section of such a size as to be able to be inserted into said longitudinal slot 85 in said alignment framework 19, and is composed of an upper longitudinal beam of circular cross-section 125 provided upperly with two lugs 126 for said support cable 20, and of two lower longitudinal beams of circular cross-section 127 and 128. These latter beams are connected together by connection rods 129 strengthened with angle pieces 130, and fitted at their longitudinal ends with two vertical openable sleeves 131 through which said support cables 17 and 18 for the alignment framework 19 pass, to guide the two sleeves 131 so that they fit over said vertical nose-shaped column supports 89 of said framework, so making said frame rigid with said framework. A longitudinal double T beam 132 is fixed centrally below said frame of triangular cross-section, and two parallel longitudinal racks 134 are welded to the underside of its lower flanges 133. Said beam 132 slidably supports the two said withdrawal and insertion carriages 22, each of which consists of a double bridge structure composed of two bridge elements 135 and 136 (see FIGS. 14 and 15) which are mounted upperly astride said double T beam 132, and are rigidly connected together on their longitudinal sides by two connection bars 137 (only one connection bar is visible in FIG. 14, the other one being disposed opposite on the other side of the beam 132), and are provided lowerly with a central longitudinal saddle 138, and, to the sides of said saddle, with two parallel longitudinal tubes 139 which connect the two said bridge elements 135 and 136 rigidly together, and emerge from both the front faces of said double bridge structure. At the centre of said tubes 139, between the two bridge elements 135 and 136 of the double bridge structure, there are rotatably mounted the two pairs of jaws 140 and 141, of two gripping clamps which are each operated by two double acting hydraulic cylinders 142 hinged between the ends of the jaws and the angle pieces 143 welded to said connection bars 137. Each withdrawal and insertion carriage 22 is slidably supported by said double T beam 132 by means of four rocking pairs of wheels 144 which are hinged by pins 145 to the longitudinal inner sides of the two said bridge elements 135 and 136 and are inserted on opposite sides between the flanges of said double T beam 132. They rest in pairs on the two said lower flanges 133 of said beam, and are driven by two hydraulic motors 146 mounted on the outer longitudinal sides of the bridge element 135, the pinions 147 of which engage respectively in said two longitudinal parallel racks 134 of the double T beam 132.

Means 148 for releasing a discardable head are mounted on those ends of said tubes 139 of each withdrawal and insertion carriage 22 which project from said carriage on the side facing the other carriage. Said means 148 consist of an arcuate support bridge 149 (see FIG. 14 and 16) which is fixed on said ends of the tubes 139 by two brackets 150 welded to their ends. Said bridge 149 comprises on its front face 149' (see FIG. 4) an arcuate dovetail shaped groove 151 which rotatably supports a second arcuate bridge 152 disposed coaxially to the first and provided on its outer surface with an arcuate rack 153 and two hydraulic cylinders 154 mounted at 120° apart, their piston rods 155 emerging from the inner arcuate surface of said second arcuate bridge 152.

Said second arcuate bridge 152 is rotated by two hydraulic motors 156 which are mounted on said arcuate support bridge 149, the pinions 157 of their shafts 158 engaging in said rack 153 of the second arcuate bridge 152 by way of planetary pinions 159 rotatably supported by said arcuate support bridge 149. The coupling sleeve locking means are mounted on the other projecting ends of the two tubes 139 of each withdrawal and insertion carriage 22, and consist of an arcuate locking bridge 160, to the ends of which there are fixed two sleeves 161 which are mounted respectively over said ends of the tubes 139 and are rigidly connected to the piston rods 162 of two horizontal double acting hydraulic cylinders 163 (FIG. 14 shows only one hydraulic cylinder 163, the other being in an opposite position), which are fixed in said ends of the tubes 139. Said arcuate locking bridge 160, which can thus be moved longitudinally along said tubes, is provided on its inner arcuate surface with an arcuate groove 164 arranged to cooperate with an analogous arcuate projection on the thrust base of a coupling sleeve.

The method of operating the service frame 21 is now apparent.

By means of the support cable 20, said service frame 21 is lowered by the depot ship 1 into said longitudinal slot 85 in the alignment framework 19 until its two vertical sleeves 131 are completely mounted over the nose-shaped vertical column supports 89 of said framework, by which means said service frame 21 becomes rigidly connected to said alignment framework 19. To release and withdraw the discardable heads 15 from their respective terminal pieces 13 of the two aligned portions 4 and 5 of the pipe to be repaired, the hydraulic motors 146 of the two withdrawal and insertion carriages 22 of said service frame 21 are operated, so as to slide said carriages in opposite directions along the double T beam 132 as far as said discardable heads 15. The double acting hydraulic cylinders 142 of said carriages 22 are then operated to tighten the jaws 140 and 141 of said carriages on to the respective hollow cylindrical casing 25 of the thrust base of the two discardable heads 15 (see FIG. 19 and in particular FIG. 14). The hydraulic motors 156 of the release means 148 of the two said carriages 22 are then operated until one of the two rods 155 of the two double acting hydraulic cylinders 154 of the rotatable arcuate bridge 152 of said means 148 of the two carriages 22 comes into a position corresponding with one of said four bores 66 in the two discardable heads 15, (see FIG. 14) so that said rod 155 penetrates into said bore 66 by the operation of the relative double acting hydraulic cylinder 154, to press on a pushbutton 61 of the control slide valve of the double acting hydraulic cylinder 32 of the two discardable heads 15. From the aforegoing description, these thus become released from the respective pipe terminal pieces 13. Said hydraulic motors 146 of the two carriages 22 are then again operated to slide said carriages along the double T beam 132 in the opposite direction to the preceding, i.e. towards each other so as to withdraw the discardable heads 15 from the relative pipe terminal pieces 13 (see FIG. 20).

Finally, the entire service frame 21 with the two discardable heads 15 (see FIG. 10) clamped to the jaws 140 and 141 is raised on board the depot ship 1. All the aforesaid operations are remotely controlled from the depot ship 1.

The operation of the service frame 21 in locking the two mobile sleeve couplings of a central pipe stub on to the outer knurled surface bands 14 of the terminal pieces 13 of the two aligned portions 4 and 5 of the pipe to be repaired will be described in detail hereinafter.

Finally, FIGS. 17 and 18 illustrate in detail one of the two said coupling sleeves 24 which are slidably supported on the central pipe stub 23, each between an annular projection 165 on the end of said stub and an inner shoulder ring 166 welded to the central stub 23 in a position such that when the coupling sleeve is held against said ring 166, as illustrated by a dashed line and with the reference number 24' in FIG. 17, said sleeve does not project from the end of the stub.

Said mobile coupling sleeve 24 is constituted by a counter-thrust base comprising a longitudinal hollow cylindrical member 167, of which that end facing the other coupling sleeve is fixed by a circumferential set of bolts 168 to a fastening ring 169, whereas its front end is fixed by a like circumferential series of bolts 170 to a longitudinal union 171 in which a mobile thrust base 172 in the form of a longitudinal hollow member is partly inserted. Said mobile thrust base 172 comprises at its free end said arcuate projection 173 arranged to cooperate with the corresponding inner arcuate groove 164 in the arcuate locking bridge 160 of one of the two withdrawal and insertion carriages 22 of the service frame 21, and an inner lead-in bevel 174 to facilitate its mounting over the respective terminal piece 13 of one of the two portions 4 and 5 of the pipe to be repaired. On the outer surface of said thrust base, which is internal to said union 171, there is provided a circumferential groove 175 for housing a resilient circular segment 176 arranged to be snap-inserted into a corresponding circumferential groove 177 provided more internally on the inner surface of said union 171, in order to lock said mobile thrust base 172 in position when it has been moved longitudinally towards the counter-thrust base. In a manner substantially similar to the mobile thrust base 25-26 of said discardable heads 15, said mobile thrust base 172 is provided, on its inner surface at that end thereof inserted into said union 171, with a circumferential set of longitudinal surface slots of dovetail shape 178, in which there is slidably supported a corresponding set of locking wedges 179 comprising a toothed surface 180 arranged to cooperate with the outer knurled surface band 14 of a pipe terminal piece 13, and are kept resiliently pressed against the inner rear frontal face 181 of the union 171 of said counter-thrust base by a corresponding set of pushers 182 spring-loaded by springs 183, and housed in corresponding longitudinal cavities 184 provided circumferentially in said mobile thrust base 172 and opening into said slots 178.

Said hollow cylindrical member 167 of the counter-thrust base of the coupling sleeve 24 comprises two internal circumferential cavities 185 at its ends, and, in its middle, a circumferential ledge 186 arranged to cooperate with said annular projection 165 on one end of the central pipe stub 23. Said ledge 186 is provided in such a position that when it comes into contact with the corresponding annular projection 165, it is ensured that said locking wedges 179 face the outer knurled surface band 14 of the pipe terminal piece 13 on which the coupling sleeve 24 is mounted. Two packs of rubber rings 187 interposed with steel rings 188 (see FIG. 18) are disposed in said circumferential cavities 185 respectively, and are pressed on one side by two annular sets of hydraulic pistons 189 disposed at the ends of an annular set of longitudinal channels 190 provided in said hollow cylindrical member 167 and connecting together the two said circumferential cavities 185.

Said longitudinal channels 190 are connected together by two annular vertical channels 191 and 192 provided in said hollow cylindrical member 167, and in communication with the outside by way of a respective inlet nozzle 193 provided with a shutoff valve, for the forced injection into all said channels 190, 191 and 192 of a pressurized resinous compound, and by way of an outlet nozzle 194, also provided with a shutoff valve, for discharging the containing oil with which all said channels 190, 191 and 192 are prefilled.

The method of operating the mobile coupling sleeves 24 is as follows.

The central pipe stub 23 of suitable length and provided at its two ends with the two mobile coupling sleeves 24 is prepared on the depot ship 1. It is then hooked to the service frame 21 by tightening the jaws 140 and 141 of the two carriages 22 of said service frame on to the two respective said mobile coupling sleeves 24 held against the respective inner shoulder rings 166, i.e.

in the position 24' shown in FIG. 17 (see also FIG. 21). The arcuate projections 173 on the mobile thrust bases 172 of the two mobile coupling sleeves 24 are simultaneously inserted into the corresponding inner arcuate grooves 164 of the arcuate locking bridges 160 of the two said carriages 22 of the service frame 21.

Said central pipe stub 23 is then lowered and centered between the two terminal pieces 13 of the two aligned portions 4 and 5 of the pipe to be repaired (centering being carried out by suitably sliding the two carriages 22 of the service frame synchronously along the guide beam 132), and the hydraulic motors 146 of the two carriages 22 of the service frame 21 are operated to slide said carriages in opposite directions along the guide beam 132, thus mounting the two mobile coupling sleeves 24 on the respective pipe terminal pieces 13 until the circumferential ledge 186 of the hollow cylindrical member 167 of the counter-thrust base of each coupling sleeve 24 makes contact with the annular projection 165 of the corresponding end of the central pipe stub 23 (see FIG. 22). The double acting hydraulic cylinders 163 are now operated to move said arcuate locking bridges 160 of the two carriages 22 of the service frame 21, which causes a similar longitudinal movement of the mobile thrust bases 172 of the two coupling sleeves 24 towards the interior of the relative unions 171 of the counter-thrust bases of said coupling sleeves 24 and, as in the case of the discardable heads 15, a consequent radial movement of the wedges 179 which thus insert the teeth of their toothed surfaces 180 into the corresponding teeth on the outer knurled surface bands 14 of the two said pipe terminal pieces 13. In this manner, the two coupling sleeves 24 are locked on to the respective pipe terminal pieces 13, and this locking is maintained because when the resilient circular segment 176 of the thrust base 173 of each coupling sleeve 24 meets the relative circumferential groove 177 in the union 171 of the counter-thrust base of said coupling sleeve 24, it becomes snap-inserted into this latter, so fixing said mobile thrust bases 172 into position with respect to the relative unions 171 of the counter-thrust bases of the two coupling sleeves 24. After a pressurised resinous compound has been pressure-injected through the inlet nozzles 193 of the two coupling sleeves 24 in order to provide the hermetic seal, the double acting hydraulic cylinders 142 of the two carriages 22 of the service frame 21 are operated to open the jaws 140 and 141 and thus release the two coupling sleeves 24 from the two said carriages 22 of the service frame 21, these coupling sleeves having made the hermetically sealed connection between the terminal pieces 13 of the two aligned pipe portions 4 and 5 and the central pipe stub 23, so repairing the pipe. The service frame 21 can then be raised on board the depot ship 1. All the aforesaid operations are carried out by remote control from the depot ship 1, as already stated.

We claim:

1. A method for repairing, from a depot ship, a damaged pipe laid on deep sea beds, comprising lowering an apparatus equipped for pipe recovery from a depot ship, guiding it and clamping it on to the pipe to be repaired, cutting the pipe at one end of its damaged piece by the cutting device of said apparatus, inserting and locking the composite sealing and recovery head of said apparatus into that end of the pipe portion which has been freed from the damaged part, freeing said apparatus and recovering it on board the depot ship, emptying the water which fills said pipe portion, raising the end portion of said pipe portion on to the depot ship by a recovery cable hooked to said composite sealing and recovery head, and releasing the raised end of said pipe portion from said composite sealing and recovery head on board the depot ship, and further comprising subsequently welding a compensation pipe piece to said raised end of the pipe portion on the depot ship and welding to the compensation pipe piece a pipe terminal piece comprising an outer knurled surface band, locking to the free end of said pipe terminal piece, on board the depot ship, a discardable quick-release head which covers and protects said outer knurled surface band of the terminal piece, relaying on the sea bed said end of the pipe portion prepared in this manner by means of a discardable cable hooked to said discardable head, releasing said discardable cable from said discardable head, repeating all the aforesaid stages required to free the other portion of the pipe to be repaired from said piece of damaged pipe, recovering and preparing on board the depot ship the end of said other pipe portion and relowering on to the sea bed said end of said other pipe portion also provided with a compensation pipe piece, a pipe terminal piece and a discardable head, then lowering an alignment framework from the depot ship on to the sea bed over the two said prepared pipe pieces by means of two support cables, the alignment framework being provided with mobile gripping clamps, fixed alignment supports for the pipe and a positionable device for determining the free distance between the two pipe portions, aligning the two said prepared pipe portions and keeping them aligned by clamping the two said pipe portions with said mobile gripping clamps of the framework and moving them on to said fixed alignment supports, filling the aligned pipe portions with water, lowering a service frame from the depot ship into a longitudinal slot in said alignment framework and guiding it by means of the two said support cables of said framework, the service frame being provided lowerly with two longitudinally slidable withdrawal and insertion carriages, each of which is provided with gripping clamps, means for releasing a discardable head and means for locking a coupling sleeve, moving the two carriages of said service frame on to the respective discardable heads of the two said aligned portions of the pipe to be repaired and clamping said heads with the gripping clamps of said carriages, releasing said discardable heads from the respective pipe terminal pieces of the two aligned pipe portions by said release means of the two carriages and withdrawing said discardable heads from said pipe terminal pieces by moving said carriages, recovering on board the depot ship said discardable heads thus freed by raising said service frame, positioning against the terminal pieces of the two aligned pipe portions said alignment framework device for determining the free distance between the two said pipe terminal pieces, returning said alignment framework device to its rest position, preparing on the depot ship a central pipe stub of the determined length, and provided at its ends with two quick locking coupling sleeves which can each slide thereon between an annular projection on the end of said stub and an inner shoulder ring at which the sleeve does not project from the stub, said coupling sleeves being also provided with means to provide a hermetic seal between them and, respectively, said central pipe stub and said terminal pieces of the portions of pipe to be repaired, locking said central pipe stub on to said service frame by tightening the gripping clamps of the two carriages of said service frame on to said coupling sleeves held against said inner shoulder rings, relowering said service frame fitted with said central pipe stub from the depot ship into said longitudinal slot in the alignment frame, while at the same time synchronously moving the two service frame carriages so that said central pipe stub becomes centred between the terminal pieces of the two aligned pipe portions, mounting said coupling sleeves of the central pipe stub on to the respective terminal pieces of the two aligned pipe portions by sliding them so far as the respective annular projections on the ends of the central stub by moving the relative service frame carriages, locking said coupling sleeves of the central pipe stub against said outer knurled surface band of the respective terminal pieces of the two aligned pipe portions using said locking means of the respective carriages of said service frame, making the hermetic seal between said coupling sleeves and, respectively, said central pipe stub and said terminal pieces of the two aligned pipe portions by acting on said seal means of said coupling sleeves, releasing said coupling sleeves of the central pipe stub from the gripping clamps of the two carriages of said service frame and raising said service frame on to the depot ship, laying the joined pipe on to the sea bed by lowering said mobile gripping clamps of said alignment framework, releasing the joined pipe from said mobile gripping clamps of the alignment framework, and finally recovering said alignment framework on board the depot ship.

2. A method as claimed in claim 1, wherein said quick release discardable heads, which have to be locked to the free ends of the terminal pieces of the two portions of pipe to be repaired and which have to cover and protect the outer knurled surface band of said terminal pieces, are each constituted by a longitudinally mobile thrust base composed of a substantially cylindrical outer casing into one end of which there is inserted the terminal piece of one of the two portions of pipe to be repaired, and which is closed at its other end by a nose-shaped head provided with a pin for hooking the ring end of a discardable cable, and a fixed counter-thrust base situated inside said mobile thrust base and comprising a bedding sleeve into which said terminal piece is also inserted, and which comprises a guide for the longitudinal sliding of a vertical pin inside said mobile thrust base and is resiliently locked on one side of a vertical disc by a set of strong retention springs kept pressed between it and the nuts of an analogous set of bolts welded in a ring on to said side of the vertical disc, which is provided on its other side with a seal ring cooperating with the front edge of the end of said terminal piece, and with a cylindrical chamber insertable into said terminal piece and containing the cylinders for feeding the hydro-pneumatic system for operating a horizontal double acting cylinder hinged at its ends between a support plate rigid with said mobile thrust base and a support plate welded to said side of the vertical disc of said fixed counter-thrust base, said mobile thrust base being also provided internally at the outer knurled surface band of said terminal piece inserted therein, with a circumferential set of longitudinal inclined surface slots of dovetail shape to slidably house a corresponding set of locking wedges with a toothed surface in the direction of said outer knurled surface band of said terminal piece, and are held resiliently pressed against the front edge of said bedding sleeve of said fixed counter-thrust base by a corresponding set of spring-loaded pushers housed in corresponding longitudinal cavities in said mobile thrust base, which is also provided with four bores disposed at 90° to each other, inside which are situated the pushbuttons of four slide valves for causing said double acting hydraulic cylinder to rapidly release the discardable head from the terminal piece.

3. A method as claimed in claim 1, wherein said alignment framework for aligning on the sea bed the two prepared portions of pipe to be repaired and keeping them aligned, for determining the free distance between said pipe terminal pieces of the two pipe portions and for guiding said service frame is constituted by a long trellis of rectangular cross-section composed of two upper longitudinal beams of circular cross-section and two corresponding lower longitudinal beams of circular cross-section connected together vertically by uprights and horizontally by upper and lower cross-members, the trellis comprising in its upper middle portion a longitudinal slot, at the ends of which and coinciding with the longitudinal axis of the trellis there are provided two vertical nosed column supports connected upperly to the two framework support cables and welded lowerly to two brackets projecting from two lower cross-members of said trellis, there being also lowerly welded to said cross-members two fixed inverted V alignment supports, a further two fixed inverted V alignment supports being disposed on the longitudinal axis of the trellis by welding underneath two other lower cross-members situated respectively at the ends of said trellis, on which, on four of its uprights mounted in opposing pairs on one side of its centre line and on a further four of its uprights mounted in opposing pairs on its other side, there are mounted eight vertical guides in which eight vertical threaded square ingot screws can rotate driven by relative hydraulic motors, and which pass in pairs through the similarly threaded sleeves which, welded to the ends of four horizontal girders, are inserted into said vertical guides, each of said four horizontal girders, which can thus be moved vertically, being provided lowerly and over their entire length with two parallel racks which cooperate with the pinions of two hydraulic motors mounted opposing said horizontal girder on a bridge carriage which is thus movable in both directions along said horizontal girder and thus transversely to said trellis by means of four pairs of rocking wheels which rest respectively in pairs on the two flanges of an inverted T beam welded below said horizontal girder, said bridge carriage being also provided lowerly with a central longitudinal saddle for a pipe portion, and, to the sides of said central saddle, with two parallel longitudinally directed pins on which are hinged the two jaws of a gripping clamp, which are operated by four double acting hydraulic cylinders hinged two on one side of said carriage and two on the other side, between the ends of said jaws and a support rigid with said carriage respectively, said trellis being finally provided with a positionable device for determining the free distance between the two terminal pieces of the two aligned portions of the pipe to be repaired.

4. A method as claimed in claim 1, wherein said positionable device provided on said trellis constituting the alignment framework for determining the free distance between the two terminal pieces of the two aligned portions of the pipe to be repaired, is constituted by a horizontal graduated rod disposed longitudinally which, fitted at its ends with two levers hinged to the base of two uprights of said trellis so that they correspond with said slot in said trellis and are thus below and between the terminal pieces of the two aligned portions of the pipe to be repaired, can be rotated and positioned against the two said terminal pieces by two hydraulic double acting cylinders hinged respectively between said levers and said lower longitudinal beam of said trellis to which the two said uprights are welded, said rod being provided with a central projecting mark, a rack disposed over its entire length and two slider carriages which can slide along said rod in opposite directions from said central mark, each by means of a toothed wheel of which the number of revolutions made can be measured and which, engaging with said rack, is rotated by a hydraulic motor provided on each carriage, which in its turn stops only when one of its impact portions, provided with a lever switch for stopping said motor, collides against the front end of a terminal piece of the two aligned portions of the pipe to be repaired.

5. A method as claimed in claim 1, wherein said service frame for releasing and recovering on to the depot ship said discardable heads fixed to the terminal pieces of the two aligned portions of the pipe to be repaired, for lowering from the depot ship and centering a central pipe stub between the two said terminal pieces and for inserting and locking the coupling sleeves of said central pipe stub on to said terminal pieces, is constituted by a frame of triangular cross-section insertable into said slot in said alignment framework and composed of an upper longitudinal beam of circular cross-section provided upperly with two lugs for a support cable, and two lower longitudinal beams of circular cross-section connected together by rods and fitted at their longitudinal ends with two openable vertical sleeves through which said support cables for the alignment framework pass and into which said two nose-shaped vertical column supports of said framework fit, to said frame there being lowerly fixed a longitudinal double T beam along which can slide two withdrawal and insertion carriages each constituted by a double bridge structure slidably supported on both sides of said double T beam by four rocking wheel pairs which are inserted between the flanges of said beam on the opposing sides and rest in pairs on the two lower flanges of the beam, and is driven by two hydraulic motors mounted on the two longitudinal sides of the structure, their pinions engaging respectively in two parallel longitudinal racks welded under said lower flanges of said double T beam, said double bridge structure being further provided lowerly with a central longitudinal saddle and, to the sides of said central saddle, with two longitudinal parallel tubes emerging from both the front faces of the structure, at their centres, i.e. between the two bridges of the double bridge structure, there being rotatably mounted the two respective pairs of jaws of two gripping clamps which are each operated by two hydraulic double acting cylinders hinged between the ends of the jaws and said double bridge structure, means for releasing a discardable head being mounted on the ends of said tubes which emerge from the double bridge structure which face the other withdrawal and insertion carriage, whereas on the other projecting ends of said tubes there are mounted means for locking a coupling sleeve.

6. A method as claimed in claim 1, wherein said means for releasing a discardable head, which are mounted on the facing ends of said tubes projecting from the two withdrawal and insertion carriages of said service frame, consist of an arcuate support bridge which is fixed by its ends to said ends of the tubes, and comprises on one of its front faces an arcuate dovetail shaped groove which rotatably supports the second arcuate bridge disposed coaxially to the first fixed support bridge and is provided on its outer surface with an arcuate rack and two hydraulic cylinders disposed at 120° apart, their piston rods emerging from the inner arcuate surface of said second arcuate bridge through corresponding bores provided therein, said second arcuate bridge being rotated by two hydraulic motors mounted on said first fixed arcuate support bridge, the pinions of these motors engaging with said rack of said second arcuate bridge.

7. A method as claimed in claim 1, wherein said means for locking a coupling sleeve, which are mounted on said other ends of said tubes projecting from the two withdrawal and insertion carriages of said service frame, consist of an arcuate locking bridge mobile longitudinally, its ends being fixed respectively to the piston rods of two horizontal double acting cylinders which are fixed inside said other ends of the tubes, said mobile locking bridge being provided on its inner arcuate surface with an arcuate groove arranged to cooperate with a similar arcuate projection on the thrust base of a coupling sleeve.

8. A method as claimed in claim 1, wherein the two said coupling sleeves slidably supported on a central pipe stub respectively between an annular projection on the end of said stub and an inner shoulder ring, and provided with hermetic seal means, said coupling sleeves having to be mounted respectively over the terminal pieces of the two aligned portions of the pipe to be repaired and locked against said outer knurled surface bands of said terminal pieces, are each constituted by a counter-thrust base comprising a hollow cylindrical member bolted longitudinally at that end facing the other coupling sleeve to a fastening ring, and at its other end to a union which comprises internally two circumferential cavities at its said ends, and, in its middle part, a circumferential ledge arranged to cooperate with said annular projection on the ends of the stub, and a mobile thrust base in the shape of a hollow cylinder which, partly inserted longitudinally into said union of the counter-thrust base, comprises at its free end an arcuate projection arranged to cooperate with said corresponding inner groove of said mobile locking bridge of the withdrawal and insertion carriages of said service frame, and an inner lead-in bevel to facilitate its said mounting on the respective terminal piece, and, on its outer surface inserted into said union, a circumferential groove for housing a resilient circular segment arranged to snap-insert into a corresponding circumferential groove provided more internally on the inner surface of said union in order to lock in position said mobile thrust base when moved towards said counter-thrust base, and is also provided, internally at its other end inserted into said union, with a circumferential set of longitudinal inclined surface slots of dovetail shape which slidably house a corresponding set of locking wedges having a toothed surface arranged to cooperate with said outer knurled surface band of said terminal piece, and are maintained resiliently pressed against the inner front rear face of said union by a corresponding set of spring-loaded pushers and housed in corresponding longitudinal cavities in said mobile thrust base, said hermetic seal means being constituted by two packs of rubber rings interposed with steel rings which, housed respectively in said circumferential cavities of said hollow cylindrical member of the counter-thrust base, are pressed on one side by two annular sets of hydraulic pistons disposed at the ends of an annular set of longitudinal channels provided in said hollow cylindrical member of the counter-thrust base, and connecting together the two said circumferential cavities, which are connected together by two vertical annular channels also provided in said hollow cylindrical member of the counter-thrust base and emerging therefrom by way of a respective inlet nozzle provided with a shutoff valve for the forced injection of a pressurised resinous compound into all said channels, and with an outlet nozzle also provided with a shutoff valve for discharging the containing oil with which all said channels are prefilled.

* * * * *